(12) United States Patent
Zamora et al.

(10) Patent No.: US 12,288,207 B2
(45) Date of Patent: Apr. 29, 2025

(54) DIGITAL CHECKS

(71) Applicant: culionXchange, Cupertino, CA (US)

(72) Inventors: Anthony Zamora, Metro Manila (PH); Eliodoro Batingana, Cupertino, CA (US)

(*) Notice: Subject to any disclaimer, the term of this patent is extended or adjusted under 35 U.S.C. 154(b) by 153 days.

(21) Appl. No.: 17/669,373

(22) Filed: Feb. 11, 2022

(65) Prior Publication Data

US 2023/0259924 A1 Aug. 17, 2023

(51) Int. Cl.
G06Q 20/38 (2012.01)
G06Q 20/22 (2012.01)
G06Q 40/12 (2023.01)

(52) U.S. Cl.
CPC ....... *G06Q 20/3827* (2013.01); *G06Q 20/223* (2013.01); *G06Q 20/38215* (2013.01); *G06Q 20/3825* (2013.01); *G06Q 20/3829* (2013.01); *G06Q 40/128* (2013.12)

(58) Field of Classification Search
CPC ............. G06Q 20/3827; G06Q 40/128; G06Q 20/223; G06Q 20/38215; G06Q 20/3825; G06Q 20/3829
See application file for complete search history.

(56) References Cited

U.S. PATENT DOCUMENTS

| | | | | |
|---|---|---|---|---|
| 5,265,007 A * | 11/1993 | Barnhard, Jr. | ....... | G06Q 20/023 705/45 |
| 2003/0220886 A1 * | 11/2003 | Lam | ....... | G06Q 20/02 705/71 |
| 2012/0278239 A1 * | 11/2012 | Nosek | ....... | G06Q 40/06 705/44 |
| 2015/0032630 A1 * | 1/2015 | Mitchell | ....... | G06Q 20/042 705/45 |
| 2022/0067674 A1 * | 3/2022 | Yan | ....... | G06Q 20/042 |
| 2022/0253840 A1 * | 8/2022 | Kolchin | ....... | G06Q 20/227 |
| 2023/0114684 A1 * | 4/2023 | Jakobsson | ....... | H04L 9/3213 713/159 |
| 2023/0115684 A1 * | 4/2023 | Juntilla | ....... | G06Q 20/3278 705/41 |
| 2023/0186309 A1 * | 6/2023 | Kurian | ....... | G06Q 20/3674 705/44 |

OTHER PUBLICATIONS

Vivek Badani, "What is a Non-Fungible Token (NFT), and How Does It Work?", Apr. 6, 2021 (Year: 2021).*

* cited by examiner

*Primary Examiner* — Jamie R Kucab
*Assistant Examiner* — Timothy Paul Sax
(74) *Attorney, Agent, or Firm* — J.H. Lin Patent Law P.C.; John H. Lin

(57) ABSTRACT

A digital checking system retrieves a first non-fungible token of a digital check from a distributed ledger implemented by a blockchain. The first token includes (i) a set of parameters of the digital check and (ii) a first service data describing a first transaction performed on the digital check. The set of parameters of the digital check includes a check amount, a payor, a payee, a check date, a bank identifier, and a user signature of the digital check. The system receives a second service data describing a second transaction performed on the digital check that is subsequent to the first transaction. The system stores a second non-fungible token of the digital check into the distributed ledger. The second token includes (i) the set of parameters of the digital check and (ii) the second service data.

18 Claims, 30 Drawing Sheets

DIGITAL CHECKS

BACKGROUND

Technical Field

The present disclosure generally relates to a method of implementing digital checks.

Description of the Related Arts

A check is a document that orders a bank or credit union to pay a specific amount of money from one person's account to another person in whose name the check has been issued. The person writing the check (the payor or the drawer), has a transaction account (e.g., a checking account) with a bank where the money is held. The written check identifies a payee (e.g., a person or a business), specifies a monetary amount and a date. Once signed, the check orders the bank hosting the checking account to transfer the amount specified on the check to the payee.

Traditional checking uses handwritten checks as customer input. One or more banks process the paper check by manual sorting, scanning/imaging, and/or entering check data. A clearing house then sorts and moves the check (in physical paper form or in digital form under cheque truncation system) to the paying bank and transfer the fund from the payor account to the payee (as cash or as account credit). Modern banking may use mobile phone or web application to scan or image physical checks, but banks and clearing houses still enter check data and sort and move the scanned checks.

SUMMARY

Some embodiments provide a digital checking system implemented by using a distributed ledger in a blockchain. In some embodiments, the system retrieves a first non-fungible token of a digital check from the distributed ledger. The first token includes (i) a set of parameters of the digital check and (ii) a first service data describing a first transaction performed on the digital check. The set of parameters of the digital check includes a check amount, a payor, a payee, a check date, a bank identifier, and a user signature of the digital check. The first service data identifies (i) a person that performed the transaction, (ii) a service that was performed in the first transaction, and (iii) a time stamp of when the service was performed. The system receives a second service data describing a second transaction performed on the digital check that is subsequent to the first transaction. The system stores a second non-fungible token of the digital check into the distributed ledger. The second token includes (i) the set of parameters of the digital check and (ii) the second service data. The first token may be stored in a first block of the blockchain and the second token may be stored in a second block of the blockchain, where the second block is added to the blockchain after the first block.

In some embodiments, the system validates a token signature of the first token with respect to a certificate of authority. The token signature of the first token is generated from data content of the first token. The first token may be generated by a first computing device and the second token is generated by a second, different computing device. For example, the first computing device may be one that is used by the payor to prepare and sign the digital check and the second computing device is used by the payee to receive the digital check.

In another example, the first computing device may be one that is used by the payee of the digital check to present the digital check to a bank, while the second computing device is one that is used by the bank to receive the digital check. In some embodiments, when the check date in the set of parameters of the digital check is after a current date (i.e., the check is a post-dated check, or PDC), the second computing device (of the bank) warehouses the digital check at the bank and delays sending the digital check to a clearing house for settlement. In some embodiments, the second computing device (of the bank) may credit an amount to an account of the payee at the bank that is discounted from the amount in the set of parameters of the digital check.

In another example, the first computing device may be one that is used by a bank to which the digital check is presented by the payee, while the second computing device is one that is used by a clearing house at which the digital check is settled. In some embodiments, when the digital check is a PDC, the second computing device warehouses the digital check at the clearing house and delays settling the digital check until the check date. In some embodiments, the second computing device (of the clearing house) identifies, based on tokens of digital checks in the distributed ledger, a first batch of digital checks and a second batch of digital checks to be settled at different time slots. A timing interval separating a first time slots for settling the first batch of digital checks and a second time slot for settling the second batch of digital checks is configurable. In some embodiments, the second computing device dynamically determines the timing interval based on a network condition and a number of checks to be settled.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a system for an efficient digital check payments solution. The system allows consumers and businesses to securely prepare-sign-send and deposit check using smartphones or computers. The system connects payer-to-payee and banks-to-clearing houses through Distributed Ledger Technology (DLT) based exchanges. In some embodiments, services performed on each digital check are recorded on a blockchain as non-fungible tokens. Money is electronically withdrawn from the payer's checking account, transferred over a network, and deposited into the payee's checking account, but in a manner that allows real-time audit trails like traditional paper checks.

Figure 1:
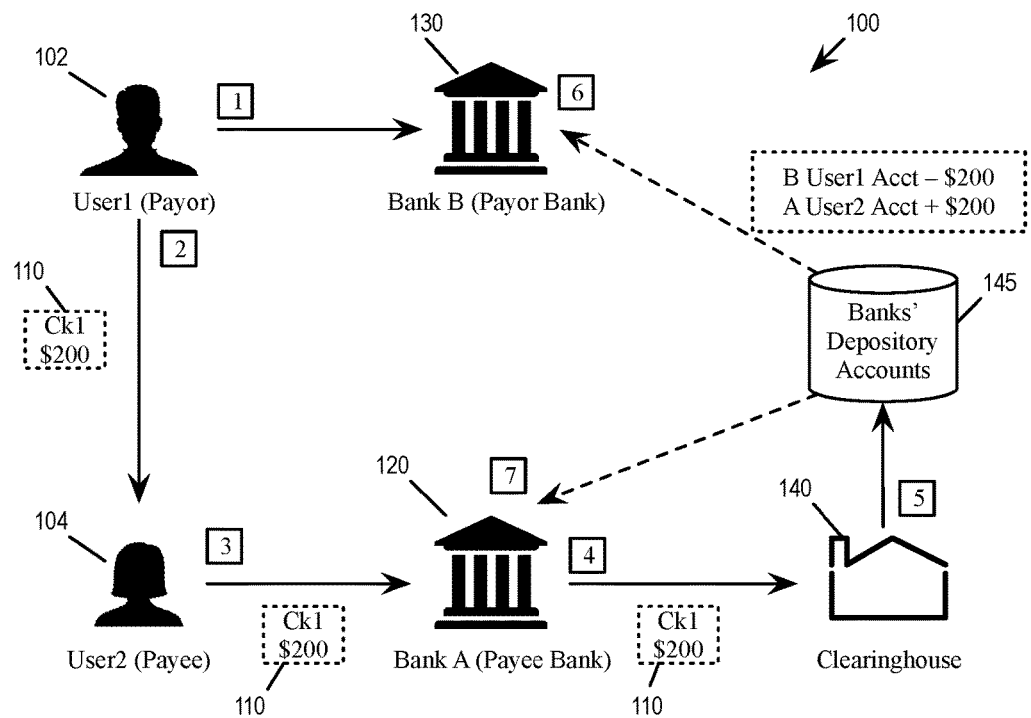
FIG. 1 conceptually illustrates a digital checking system according to an exemplary embodiment.

FIG. 1 conceptually illustrates a digital checking system 100 according to an exemplary embodiment. In the example, a first user (payor user) 102 uses the system 100 to pay a second user (payee user) 104 using a digital check 110. The payee user 104 presents the digital check 110 to her bank 120 (bank A) (also referred to as payee bank or presenting bank). The presenting bank 120 reviews the check and approves the check for sending outward to the clearing house 140. The clearing house 140 receives the check 110 from the presenting bank 120 (and other checks from other presenting banks). The clearing house 140 performs netting and settlement on the received checks (which includes the digital check 110). After the digital check 110 is the processed by the clearing house 140, the payor's account at his bank 130 (bank B) (also referred to as payor bank or issuing bank) is debited and the payee's account at her bank 120 is credited the amount specified by the digital check (200 dollars). The issuing bank 130 may receive the processed digital check 110 from the clearing house 140.

The use of the digital check 110 involves transactions performed by a network of computing devices, including mobile devices (e.g., smartphones) of payor and payee users, computing servers used by banks and clearing houses, etc. In this detailed description, transactions described as being undertaken by users, banks, and/or clearing houses in the context of the digital checking system are understood to include operations performed by computing devices used or controlled by users, banks, and/or clearing houses.

The figure illustrates some of these transactions (labeled from '1' to '7'). At a transaction labeled '1', the payer user 102 prepares the digital check 110 by specifying an amount ($200 dollars) and a payee. The payer 102 also instructs his bank 130 to earmark the requisite fund in his account. At a transaction labeled '2', the payer user 102 signs the check and transmits the check to the payee 104. In some embodiments, an authorization code for the digital check is transmitted (by e.g., text message) to the payee 104 as a one-time password (OTP) that is required to access the digital check 110.

At a transaction labeled '3', the payee user 104 presents the digital check 110 (e.g., for deposit) to her bank 120 (bank A). At a transaction labeled '4', the payee bank 120 sends the deposited check 110 to the clearing house 140. At a transaction labeled '5', the clearing house 140 performs netting and settlement based on banks' depository accounts 145 (at a central bank), which has deposit accounts for both the payor bank and the payee bank. At a transaction labeled '6', based on the settled check, the payor bank (bank B) 130 debits the 200 dollars from the account of the payor. At a transaction labeled '7', based on the settled check, the payor bank (bank B) 130 debits the 200 dollars from the account of the payor.

In some embodiments, each transaction undertaken for a digital check is recorded in a distributed ledger or blockchain. A blockchain is a growing list of records, or blocks, that are linked together using cryptography. In a blockchain, each block includes a cryptographic hash of the previous block, a timestamp, and transaction data. The timestamp proves that the transaction data existed when the block was published so that the transaction data is part of the hash of the block. As each block contains information about the block previous to it, they form a chain, with each additional block reinforcing the ones before it. Furthermore, multiple copies of the blockchain or distributed ledger are stored across multiple nodes in the network. Therefore, blockchains are resistant to modification of their data because once recorded, the data in any given block cannot be altered retroactively without altering all subsequent blocks or without consensus from other copies of the same blockchain. A blockchain is typically managed by a peer-to-peer network for use as a distributed ledger, where nodes collectively adhere to a protocol to communicate and validate new blocks.

In the example of FIG. 1, each of the transactions labeled '1' through '7' is recorded in a distributed ledger such that the payor 102, the payee 104, the payor bank 130, the payee bank 120, and the clearing house 140 all share a unified source of truth regarding the digital check 110. The distributed ledger ensures that the recorded details of the digital check are final and immutable. Any of the parties involved in using and processing the digital check can use the content of the distributed ledger to reconstruct or determine the exact state of the check.

Figure 2:
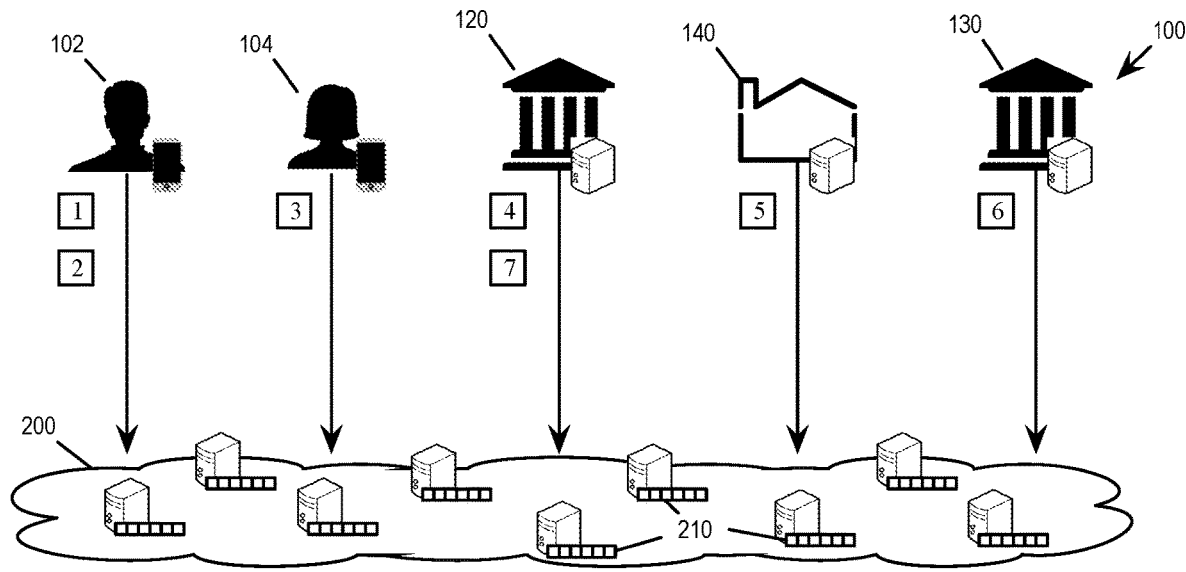
FIG. 2 conceptually illustrates the transactions undertaken for the digital check being recorded in distributed ledger.

FIG. 2 conceptually illustrates the transactions undertaken for the digital check 110 being recorded in the distributed ledger. As illustrated, the parties processing the digital check 110, namely the payor user 102, the payee user 104, the payee bank 120, the payor bank 130, and the clearing house 140 record their transactions or services regarding the digital check 110 into a blockchain network 200. More specifically, the computing devices used by each of these parties run software (e.g., web-based applications) to access a distributed ledger 210 implemented by the blockchain network 200. In some embodiments, the blockchain network 200 refers to a framework or an infrastructure (e.g., Hyperledger) that interconnects computing resources configured to operate the blockchain over a physical network. The different parties processing the digital check 110 may use the framework (or run applications that use the framework) to access the blockchain network 200 and to use the distributed ledger 210. Computing resources implementing the blockchain and the computing devices using the blockchain may communicate through protocols established by the framework.

In the figure, the transactions that took place in the example of FIG. 1 for the digital check 110 are recorded to the distributed ledger 210. Specifically, the payor user 102 records transaction '1' (prepare check) and transaction '2' (send check). The payee user 104 records transaction '3' (deposit check). The payee bank 120 records transaction '4' (send to clearing house) and transaction '7' (credit payee). The payor bank 130 records transaction '6' (debit payor). The clearing house 140 record transaction '5' (settle check). To record the transaction into the distributed ledger 210, the party undertaking the transaction uses protocols of the framework to store data of the transaction into the blockchain network 200.

In some embodiments, the digital check system 100 represents each digital check as a set of one or more records in the distributed ledger, each record corresponding to one transaction or service performed by one of the parties (users, banks, or clearing house) regarding the check. Thus, different digital checks are represented by different sets of records of transactions. As a party performs a transaction on a digital check, the information of that transaction and of that digital check is stored in a temporally newest block of the blockchain.

Figure 3:
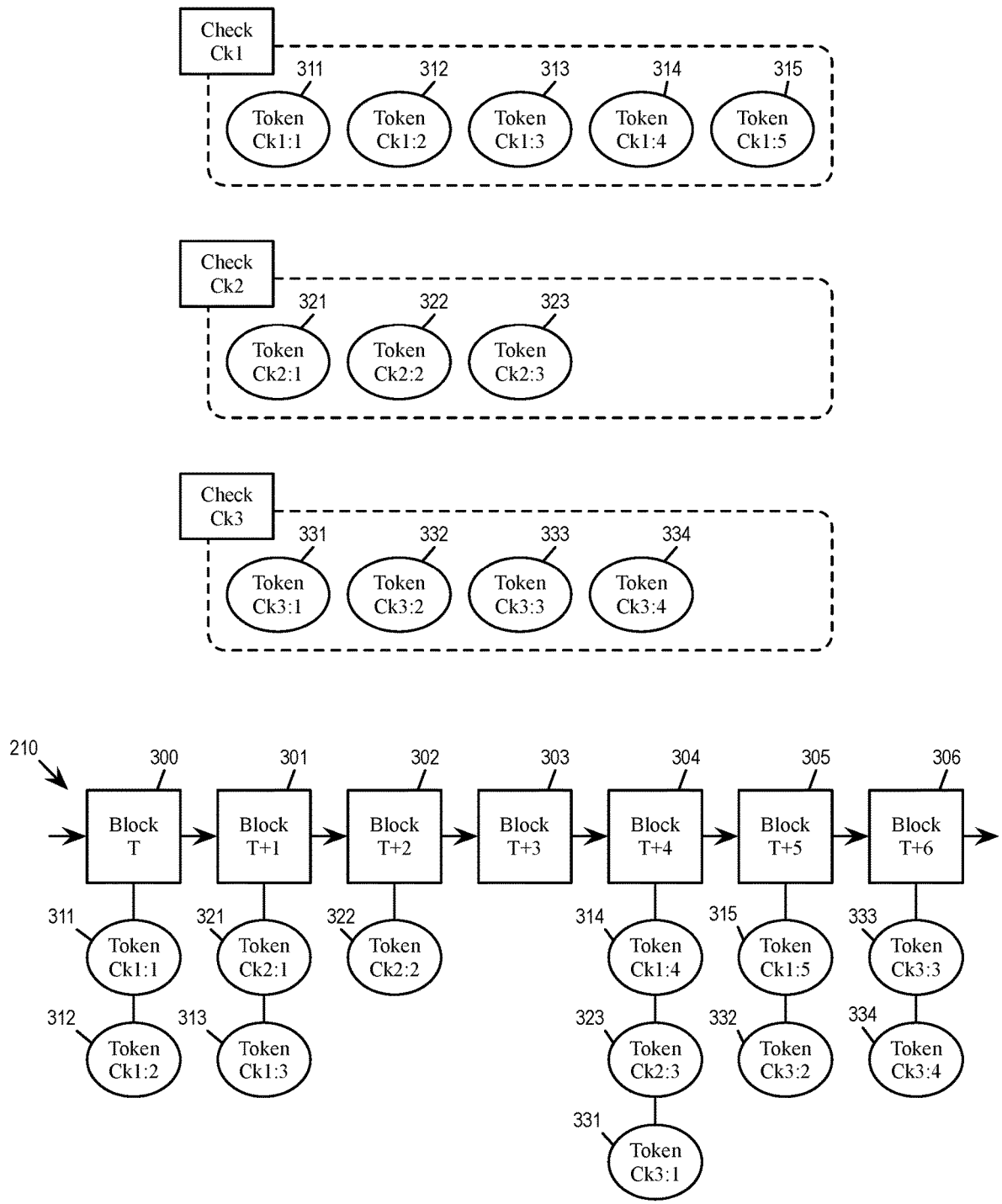
FIG. 3 conceptually illustrates digital checks being stored and represented in the distributed ledger.

FIG. 3 conceptually illustrates digital checks being stored and represented in the distributed ledger. The figure illustrates the representation of three digital checks "Ck1", "Ck2", and "Ck3" in the distributed ledger. The digital check "Ck1" is represented by five tokens 311-315, each of these five tokens represents a transaction or service performed on or for the digital check "Ck1". The digital check "Ck2" is represented by three tokens 321-323, each of these three tokens represents a transaction or service performed on or for the digital check "Ck2". The digital check "Ck3" is represented by four tokens 331-334, each of these four tokens represents a transaction or service performed on or for the digital check "Ck3". A party using the digital checking system 100 (users, banks, clearing houses) can examine the tokens of each digital check to ascertain or construct the exact status of that digital check.

As parties undertake transactions or perform services on the digital checks, the tokens representing those transactions are created and stored in the blockchain. Since the transactions take place and are recorded at different times, the tokens of those transactions may be stored in different blocks, and the token of each newly performed transaction is stored in a newest block in the blockchain. FIG. 3 shows a portion of the distributed ledger 210 that includes blocks 300-306, with the block 300 being the earliest and the block 306 being the latest of the blocks in the blockchain. In the example, tokens 311-315 that corresponds to transactions performed on the check "Ck1" are stored in blocks 300, 301, and 304. Tokens 321-323 that correspond to transactions performed on the check "Ck2" are stored in blocks 301, 302 and 304. Tokens 331- 334 that correspond to transactions performed on the check "Ck3" are stored in blocks 304, 305 and 306.

In the example of FIG. 3, each recorded transaction is stored in the distributed ledger or blockchain as a token. In a blockchain ecosystem of some embodiments, tokens are assets that allow information and values to be transferred, stored, and verified in an efficient and secure manner. Transactions can be recorded on the blockchain, and the immutability and transparency enabled by blockchain technology helps guarantee the authenticity of each token's stated history.

In some embodiments, each token used to record a transaction of a digital check is a non-fungible token (NFT), because each of such tokens is unique and is not interchangeable with any other token. However, the tokens used for recording the transactions of digital checks are not accessible by the public. They are accessible only by authenticated authorized individuals or institutions privy to the digital check.

Figure 4:
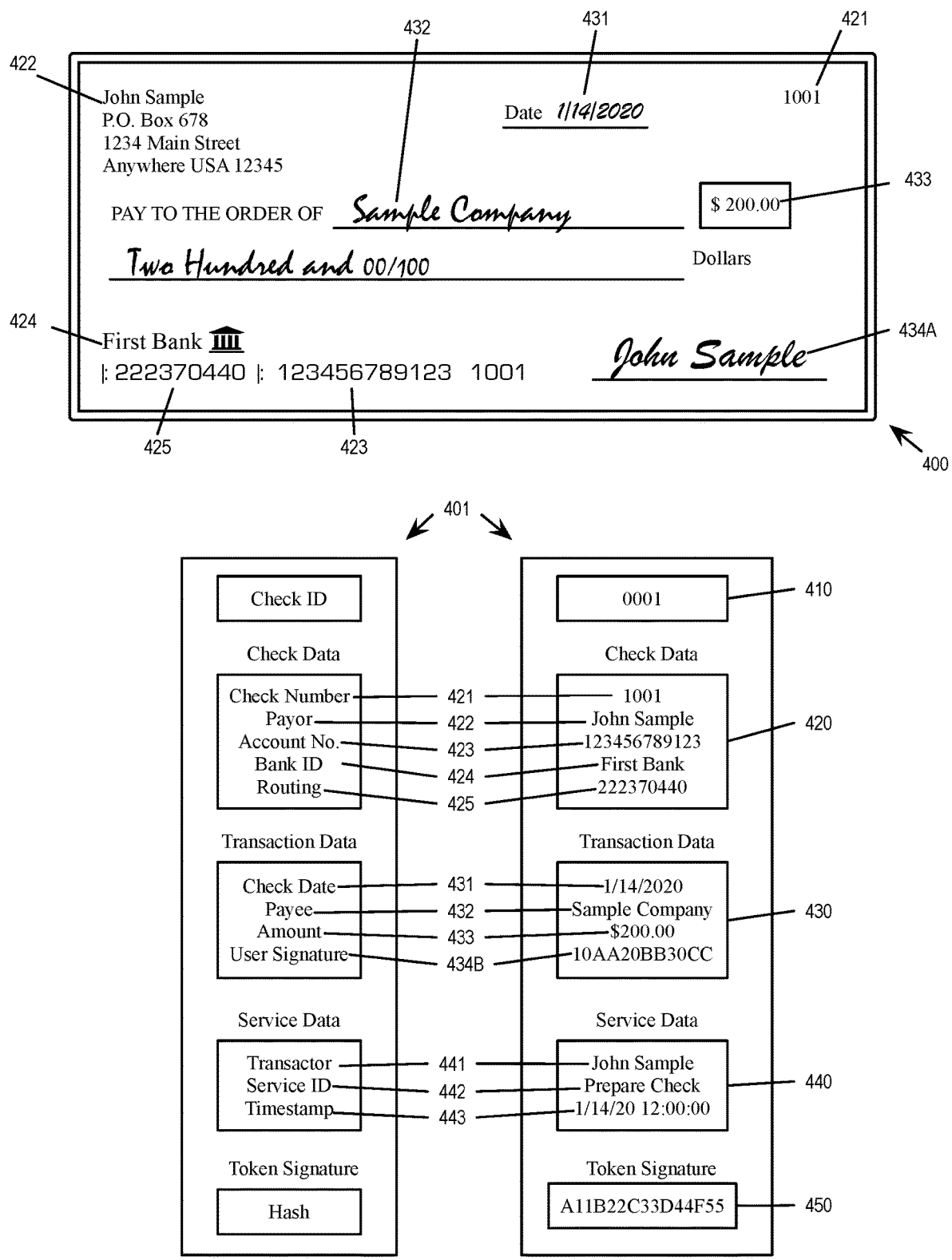
FIG. 4 conceptually illustrates a non-fungible token that is used to represent a transaction of a digital check.

FIG. 4 conceptually illustrates a non-fungible token that is used to represent a transaction of a digital check. In the figure, the digital check 110 is conceptually illustrated as a corresponding physical check 400, which has several data fields that are present in tokens of the digital check 110. A non-fungible token 401 is used to represent a particular transaction or service performed on the digital check 110. The token 401 has check ID 410, check data 420, transaction data 430, service data 440, and token signature 450.

The check ID 410 marks the token as belonging to a specific digital check.

The check data 420 represents the pre-printed information on the physical check 400. It includes data fields that are also printed on the physical check 400: check number 421; payor identity or name 422; account number 423; (payor or issuing) bank identifier 424 (e.g., a bank code, a bank name);

and routing number 425. These are fields common to all checks issued by the bank for a same account (except for the check number.)

The transaction data 430 represents the handwritten portion of the check. It includes data fields that are also filled by the payor user when using the physical check 400: check date 431 (maturity date), payee identity 432, and amount to be paid 433. The transaction data 430 of the token 401 also includes a digital user signature 434B. This digital user signature 434B is not a scanned image of the payor's signature 434A on the physical check 400 but a digital signature generated from the payor's private key for the digital check 110.

The service data 440 represents the action that was done on the check. It records information regarding a transaction or a service on the digital check 110 for which the token is created. This information is not present in the physical check 400. The service data 440 includes transactor 441 that identifies the party (an institution or a person) that performs the transaction or provides the service, (e.g., the payer user, the payee user, a bank, a clearing house, or an employee of the bank or the clearing house). The service data 440 also includes a service ID 442 that identifies the service or transaction being recorded for the digital check 110. The service data 440 also includes a timestamp 443 that indicates the date and time that the transaction or the service is performed (or recorded.)

The token signature 450 is a hash of the data content of the token 401. In some embodiments, for every token that is stored in the blockchain, a set of cryptographic data is generated as the token signature. This includes a hash that is calculated based on all the data in the token. The hash is used to validate the integrity of the token. Each organization uses its own certificate of authority node to validate the token signature. The token signature 450 can be used for maintaining privacy of transaction. Each organization may check the token signature to validate, i.e., to see whether the transaction has the requisite permission and authority to be undertaken. Only when the token signature 450 is valid is the transaction or service of the token 401 deemed valid.

A new token is created whenever a service is applied to the check. The check ID 410, the check data 420, and the transaction data 430 remain the same for all tokens belonging to the same check. The service data 440 will change depending on who performed the service, what service was performed and at what time it was performed.

FIGS. 5A-D illustrate a series of non-fungible tokens 501-512 that are generated during the life cycle of a digital check and stored into the distributed ledger 210 in the blockchain network 200. The check's lifecycle starts when a check is prepared. It ends when a check is cleared. There are several other states in a digital check's lifecycle between being prepared and being cleared. A changed in the state of the digital check is achieved through a service call.

Like the example token 401, each non-fungible token shown in FIGS. 5A-D is used to record a unique transaction or service undertaken for the digital check. Examples of services are Prepare Check, Send Check, Deposit Check and so on. The digital check of the example is the same as the digital check 110 of FIGS. 1 and 4, so each of the tokens 501-512 has the same check data and transaction data as that of the example token 401 (and the same as the physical check 400). (For example, the check data 520 and the transaction data 530 of the token 501 has the same values as the check data 420 and 430.) However, the non-fungible tokens 501-512 have different service data that correspond to different transactions and services, and each token has a different token signature that is uniquely generated based on the content of the token.

Figure 5A:
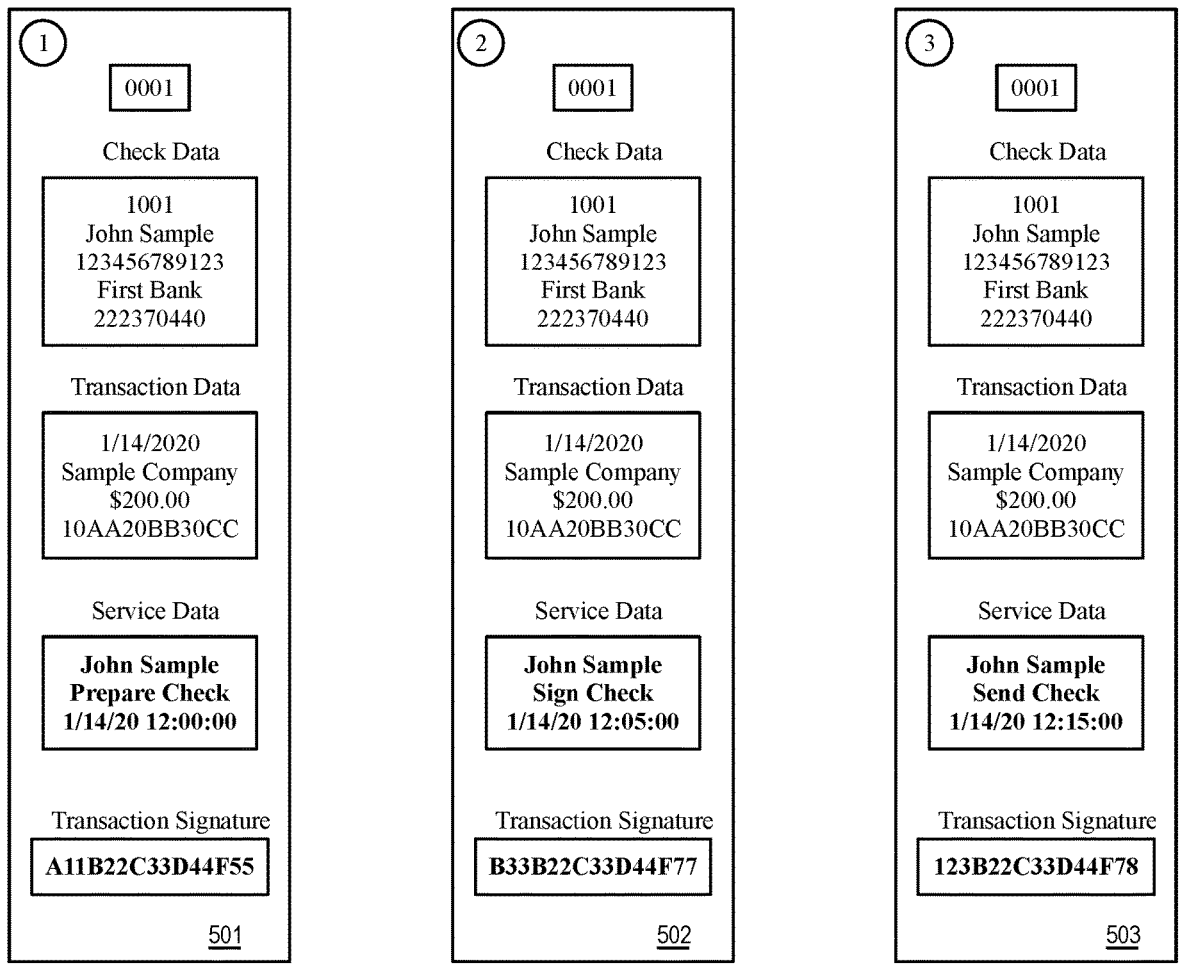
FIGS. 5A-5D illustrate a series of non-fungible tokens that are generated during the life cycle of a digital check and stored into the distributed ledger.
Figure 5A:
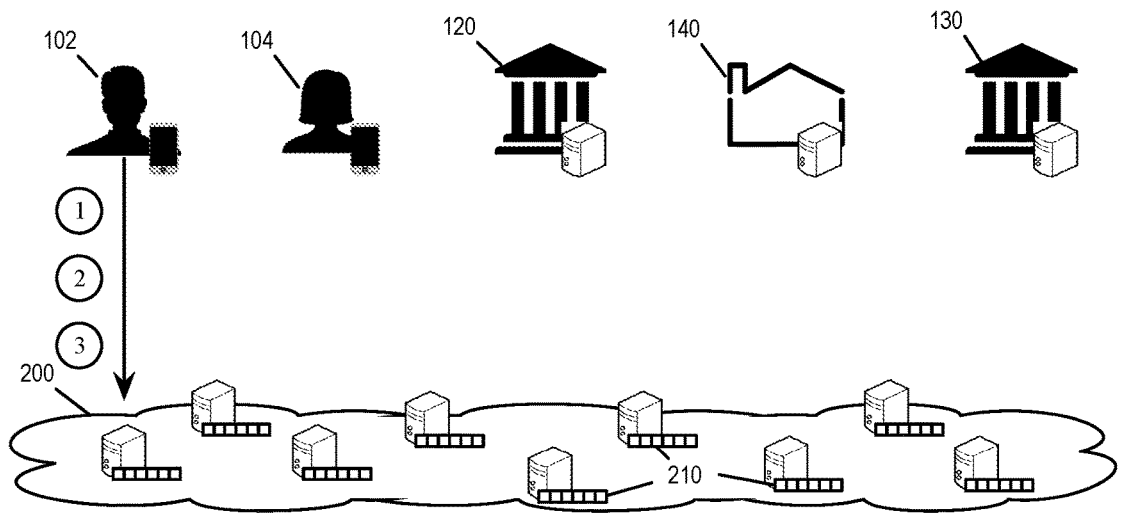

The service data of each token records the transaction on the digital check that prompted the creation of that token. FIG. 5A depicts tokens that correspond to transactions undertaken on the digital check by the payor user 102. The token 501 (labeled '1') records a "prepare check" transaction that is undertaken by "John Sample" (the payor user 102) on Jan. 14, 2020 at 12:00. The token 502 (labeled '2') records a "sign check" transaction that is undertaken by "John Sample" on Jan. 14, 2020 at 12:05. The token 503 (labeled '3') records a "send check" transaction that is undertaken by "John Sample" on Jan. 14, 2020 at 12:15.

Figure 5B:
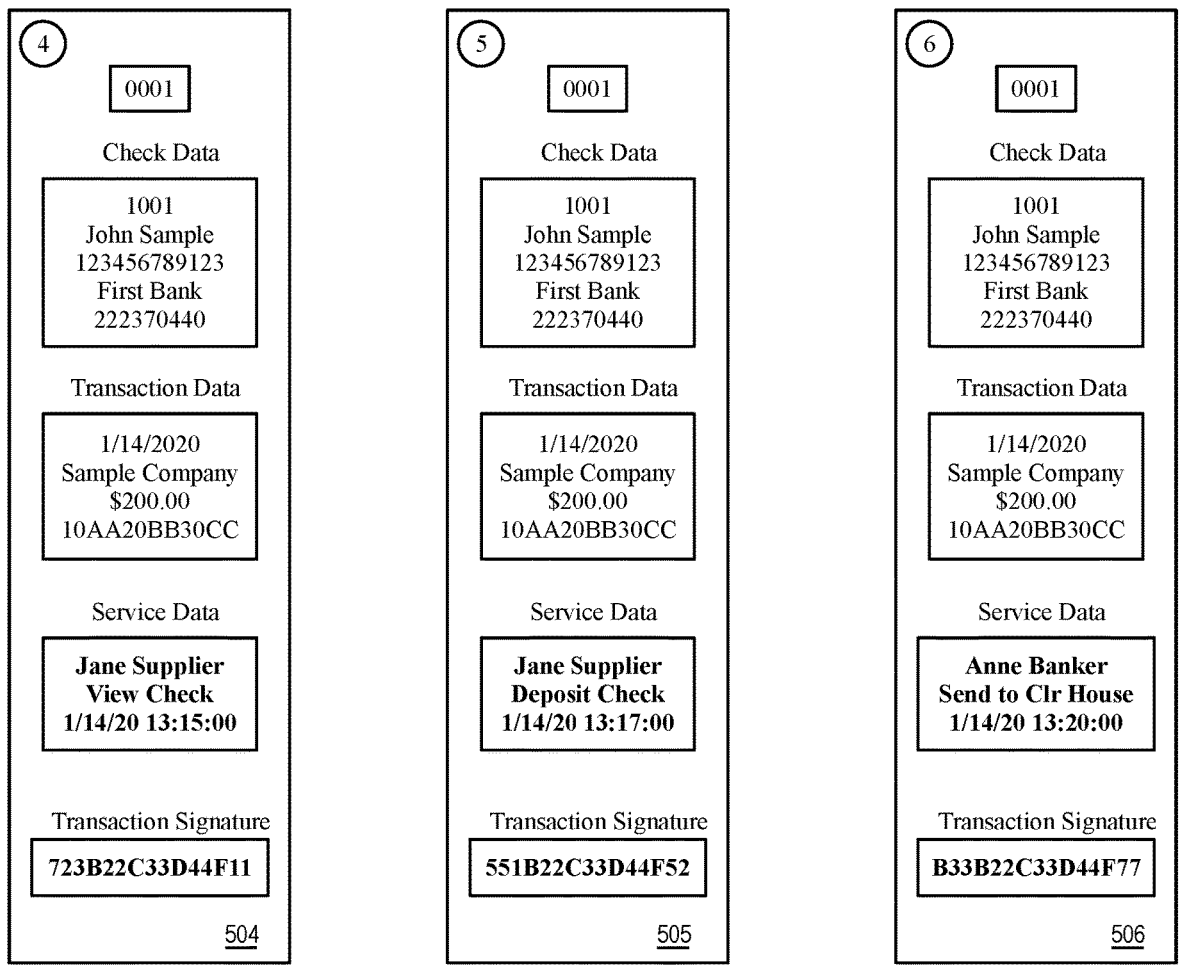
Figure 5B:
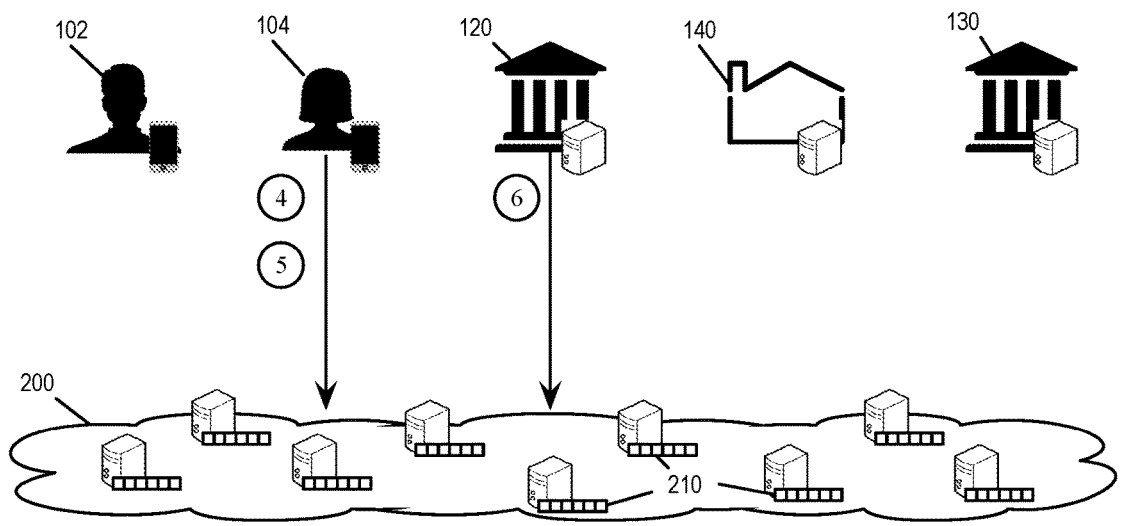

FIG. 5B depicts tokens that correspond to transactions undertaken on the check by the payee user 104 and the payee's bank 120. The token 504 (labeled '4') records a "view check" transaction that is undertaken by "Jane Supplier" (the payee user 104) on Jan. 14, 2020 at 13:15. The token 505 (labeled '5') records a "deposit check" transaction that is undertaken by "Jane Supplier" on Jan. 14, 2020 at 13:17. The token 506 (labeled '6') records a "send to clearing house" transaction that is undertaken by "Anne Banker" (an agent of the payee bank 120) at time Jan. 14, 2020 at 13:20.

Figure 5C:
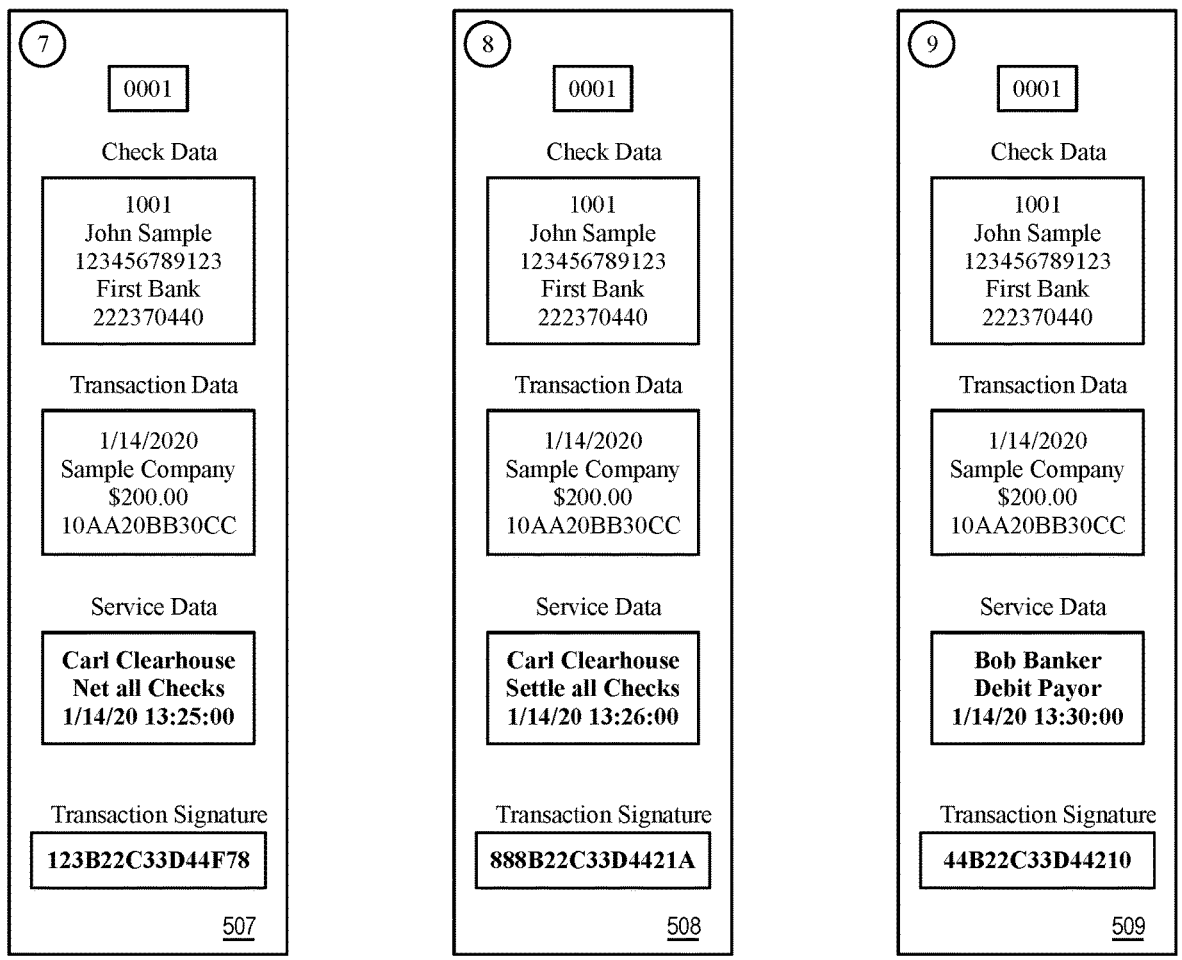
Figure 5C:
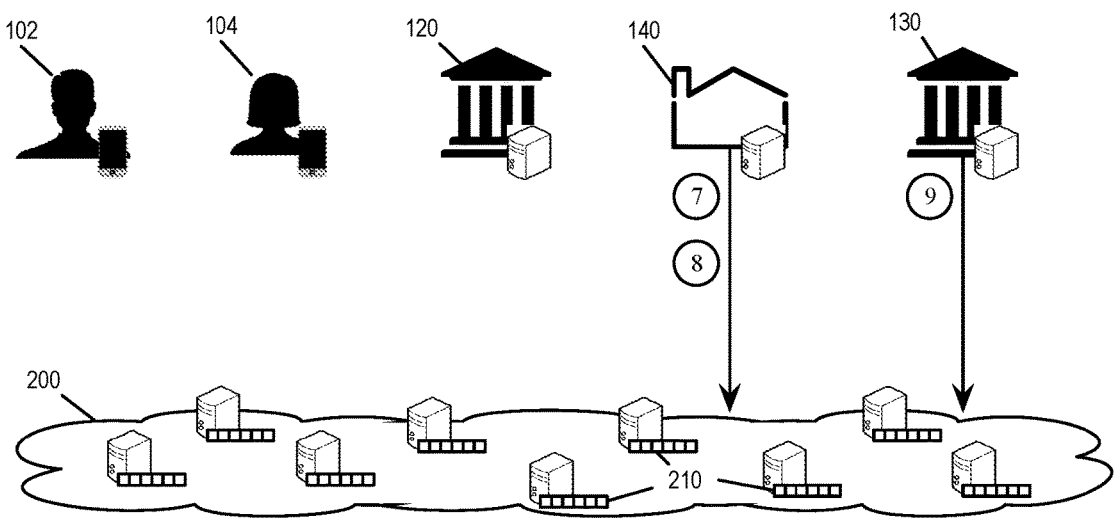

FIG. 5C depicts tokens that correspond to transactions undertaken on the check by the clearing house 140 and the payor's bank 130. The token 507 (labeled '7') records a "net all checks" transaction that is undertaken by "Carl Clearhouse" (an agent of the clearinghouse 140) on Jan. 14, 2020 at 13:25. The token 508 (labeled '8') records a "settle all checks" transaction that is undertaken by "Carl Clearhouse" on Jan. 14, 2020 at 13:26. The token 509 (labeled '9') records a "debit payor" transaction that is undertaken by "Bob Banker" (an agent of the payor bank 130) at time Jan. 14, 2020 at 13:30.

Figure 5D:
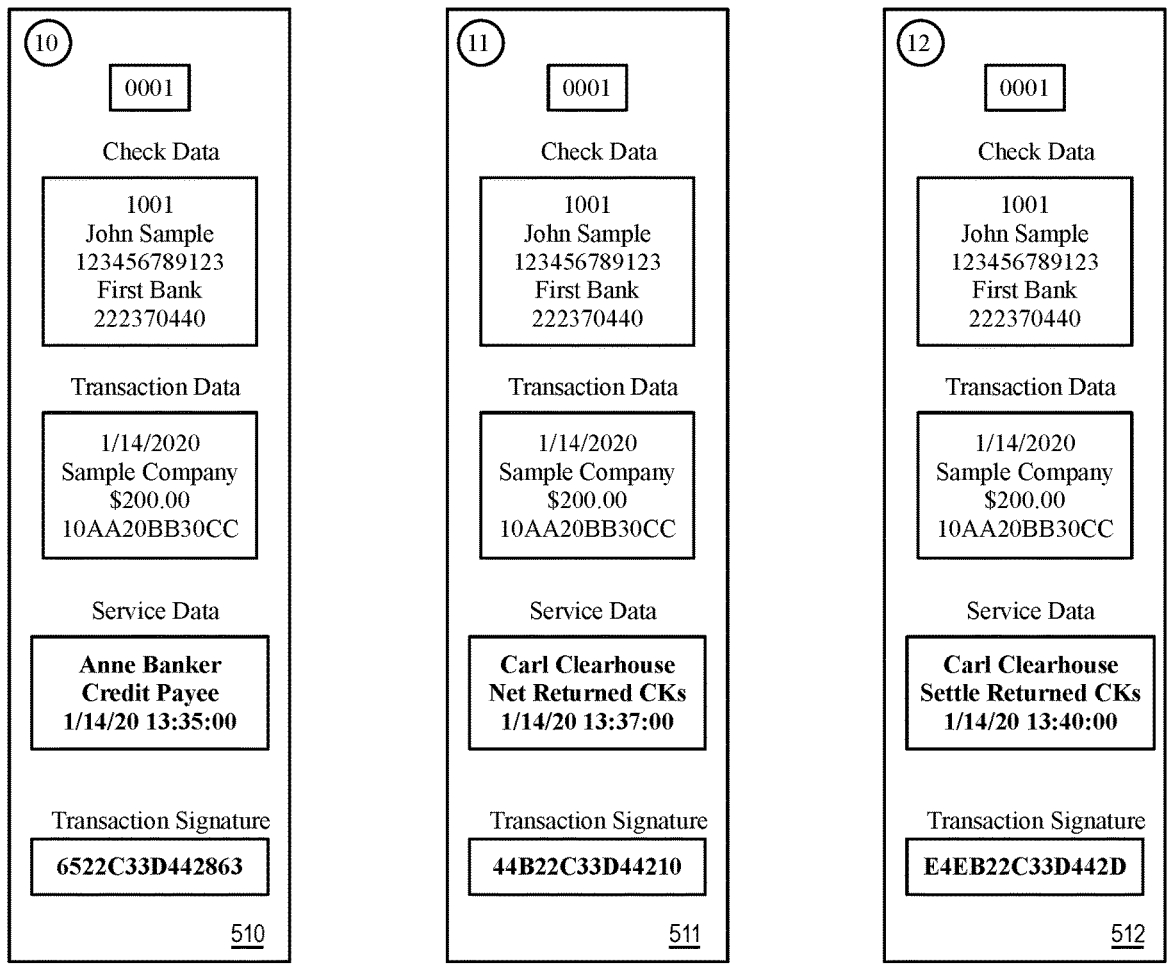
Figure 5D:
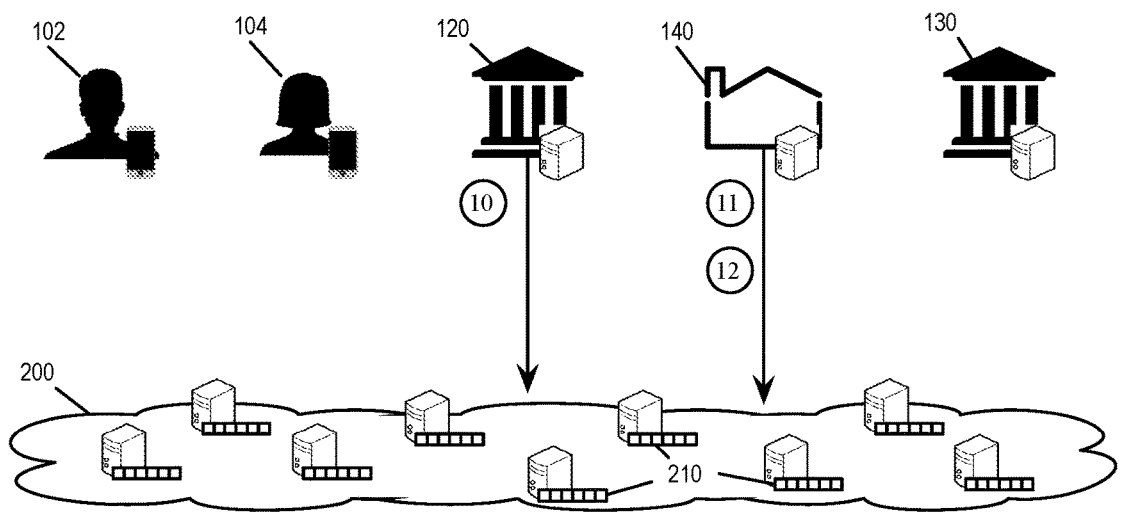

FIG. 5D depicts tokens that correspond to further transactions undertaken on the check by the clearing house 140 and the payee bank 120. The token 510 (labeled '10') records a "credit payee" transaction that is undertaken by "Anne Banker" (an agent of the payee bank 120) at time Jan. 14, 2020 at 13:35. The token 511 (labeled '11') records a "net return checks" transaction that is undertaken by "Carl Clearhouse" (agent of the clearing house) on Jan. 14, 2020 at 13:37. The token 512 (labeled '12') records a "settle return checks" transaction that is undertaken by "Carl Clearhouse" on Jan. 14, 2020 at 13:40.

Figure 6:
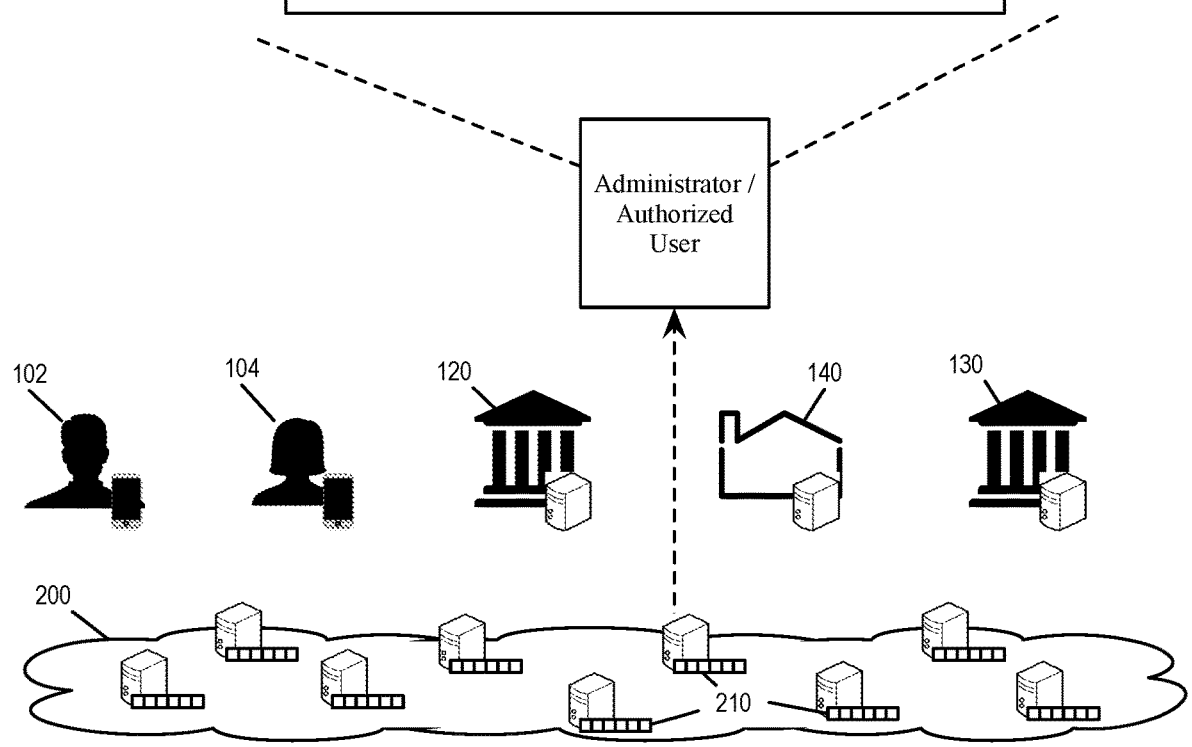
FIG. 6 conceptually illustrates a report that is generated for a digital check.

Having each transaction of the digital check stored in the blockchain allows real-time audit trail of a digital check like traditional paper checks. FIG. 6 conceptually illustrates a report that is generated for a digital check. The example report is generated based on the non-fungible tokens in the example of FIGS. 5A-D and details the transactions of the digital check. In some embodiments, the report is generated for an authorized viewer, and some transactions of the digital check may be hidden based on the authorization level and the identity of the viewer. For example, the payee user may not be able to view transactions undertaken by the payor or the payor's bank.

Figure 7:
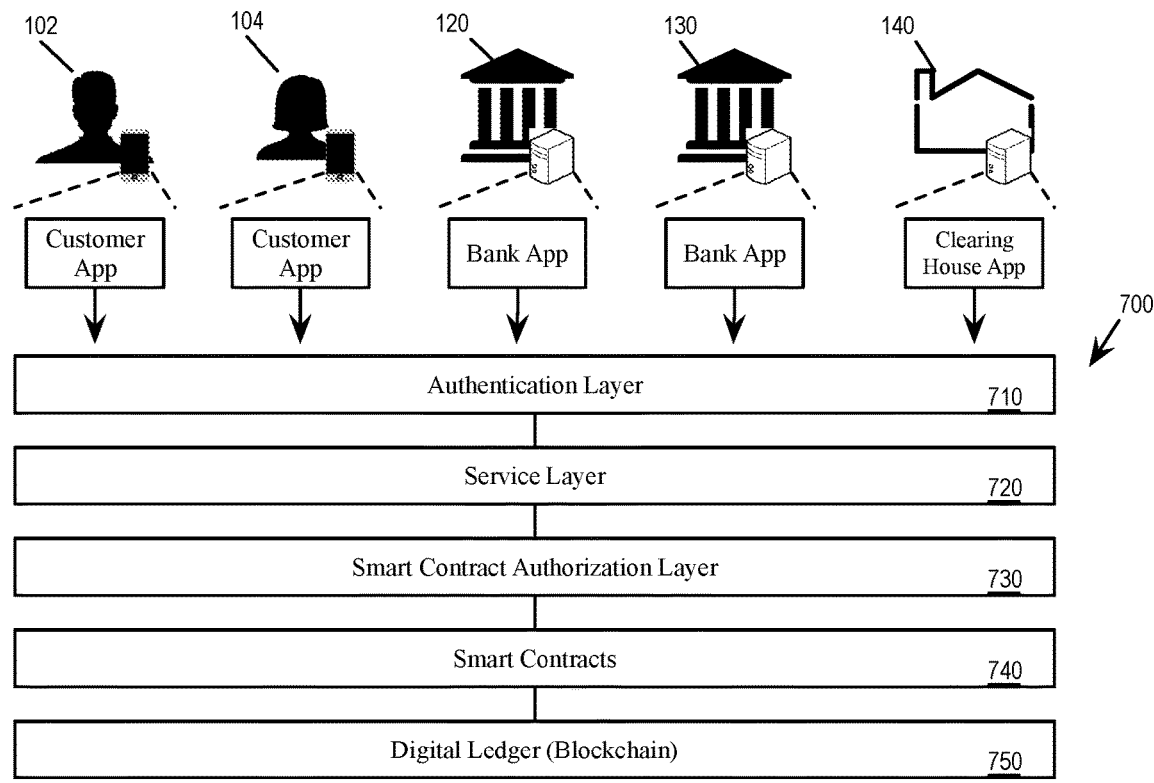
FIG. 7 conceptually illustrates a software stack for using a distributed ledger to implement digital checks.

In some embodiments, the computing devices participating in the digital check system have a software stack for using the blockchain and the distributed ledger. FIG. 7 conceptually illustrates a software stack 700 for using a distributed ledger to implement digital checks. The software stack 700 may operate in computing devices of the payor user 102, the payee user 104, the payee bank 120, the payor bank 130, and the clearing house 140. For example, the software stack 700 may operate in a customer app running in smartphones of the payor user 102 and the payee user 104. The software stack 700 may operate in a bank app running in computing servers for the payee bank 120 and the payor bank 130. The software stack 700 may operate in a clearing house app running in computing servers for the clearing house 140. Each of these apps operating the software stack 700 of the digital checking system may be a mobile app or a web application.

The software stack 700 includes an authentication layer 710, a service layer 720, a smart contract authorization layer 730, a smart contracts layer 740, and a digital ledger layer 750. The authentication layer 710 is used to authenticate whether a user of the application is authorized to use the digital checking system and to perform a transaction on a digital check. In some embodiments, this authentication may be performed based on the token signatures in the tokens of the digital checks. For a given digital check, the different parties transacting on the check (the payor, the payee, the payor bank, the payee bank, and the clearing house) may be authorized to perform different subsets of the transactions. Such authorization may be determined based on whether the user is one of the authenticated institutions or one of the authenticated account holders.

Figure 8:
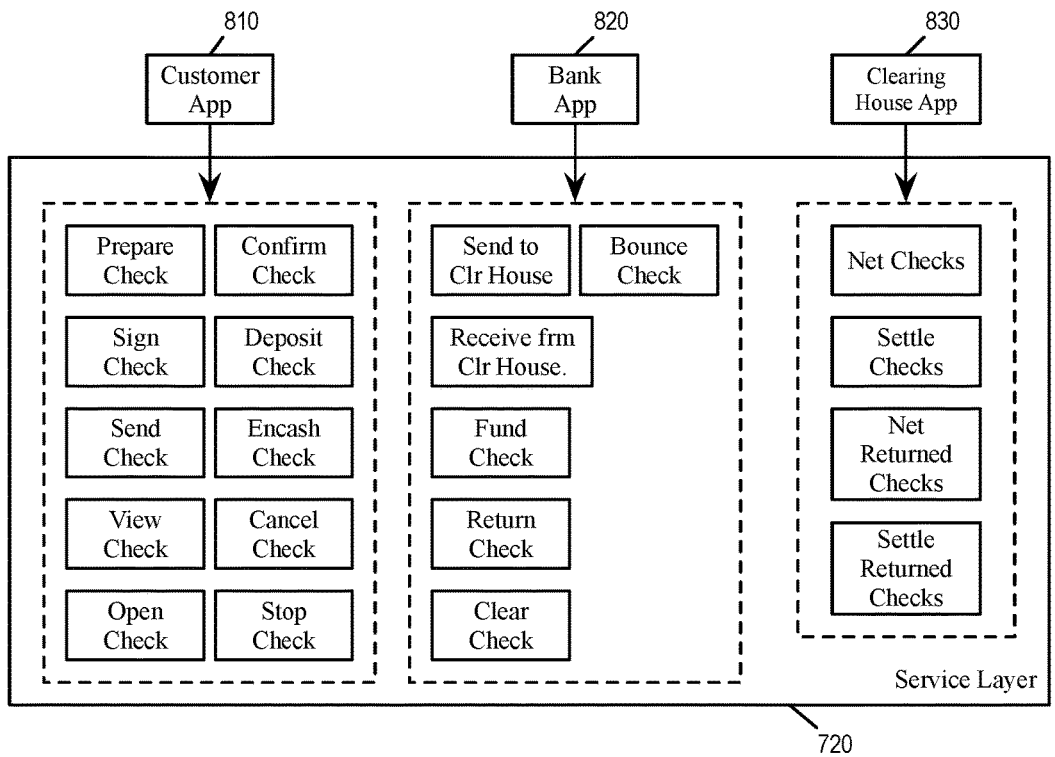
FIG. 8 conceptually illustrates the service layer of the digital check system for different types of applications.

The service layer 720 performs the transactions on the checks and initiates the recording of the transactions. FIG. 8 conceptually illustrates the service layer of the digital check system for different types of applications. The figure shows example transactions that can be performed by the service layer 720 for a customer app 810, a bank app 820, and a clearing house app 830. The customer app 810 can run as a mobile app or a web application of a bank customer (e.g., the payor 102 and the payee 104). The service layer 720 in the software stack of the customer app 810 may be limited to customer transactions on digital checks (e.g., deposit check, prepare check, sign check, encash check, etc.) The service layer 720 in the software stack of the bank app 820 may be allowed to perform bank transactions on digital checks (e.g., send check to clearing house, bounce check, debit payor, credit payee, etc.). The service layer 720 in the software stack of the clearing house app 830 may be allowed to perform clearing house transactions on digital checks (e.g., settle checks, net checks, settle returned checks, etc.).

Returning to FIG. 7. The smart contract authorization layer 730 authorizes the execution of smart contracts, which are programs that run when predetermined conditions are met, specifically to automate the execution of agreements between different parties of the digital checking system. The operations of digital checks are implemented by smart contracts operating out of the smart contract layer 740.

The digital ledger layer 750 implements the protocols for participating and accessing the blockchain, including the protocols for storing a transaction token of a digital check into a block of the blockchain. In some embodiments, the digital ledger layer 750 oversees network accesses to computing servers storing copies of the blockchain.

Figure 9:
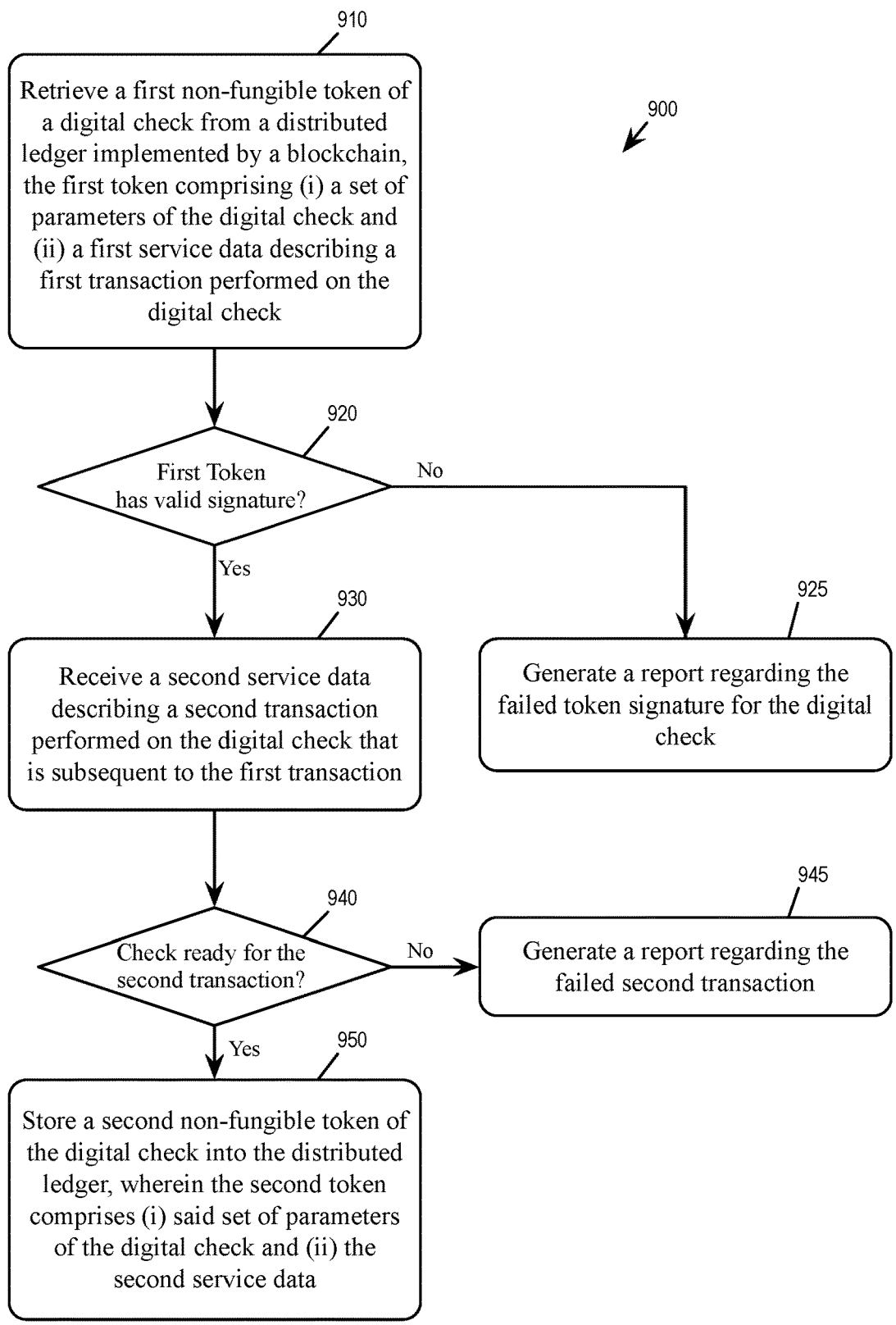
FIG. 9 conceptually illustrates a process for operating a digital checking system using a distributed ledger in a blockchain.

FIG. 9 conceptually illustrates a process 900 for operating a digital checking system using a distributed ledger in a blockchain. In some embodiments, one or more processing units (e.g., processor) of a computing device implementing the software stack 700 performs the process 1100 by executing instructions stored in a computer readable medium. Such a computing device may be mobile device running a mobile app, or a compute server running a web application. The software stack performing the process 900 may part of the customer app 810, the bank app 820, or the clearing house app 830 operating in the computing device. In some embodiments, some of the steps of the process 900 may be performed by smart contracts in the software stack.

The process retrieves (at 910) a first non-fungible token of a digital check from a distributed ledger implemented by a blockchain. The first token includes (i) a set of parameters of the digital check and (ii) a first service data describing a first transaction performed on the digital check. The set of parameters of the digital check includes a check amount, a payor, a payee, a check date, a bank identifier, and a user signature of the digital check. The first service data identifies (i) a person that performed the first transaction, (ii) a service that was performed in the first transaction, and (iii) a time stamp of when the service was performed. Parameters of a digital check, such as check data, transaction data, service data, and token signatures are described above by reference to FIG. 4. Examples of services or transactions that are recorded in tokens are described by reference to FIGS. 5A-D and 8.

The process validates (at 920) a token signature of the first token with respect to a certificate of authority. The token signature of the first token is generated from data content of the first token. If the token signature of the first token is valid, the process proceeds to 930. If the token signature fails to validate, the process generates (at 925) a report regarding the failed token signature of digital check and the process 900 terminates.

The process receives (at 930) a second service data describing a second transaction performed on the digital check that is subsequent to the first transaction. The second service data identifies (i) a person that performed the second transaction, (ii) a service that was performed in the second transaction, and (iii) a time stamp of when the service was performed.

The process determines (at 940) whether the digital check is ready for the second transaction based on the first token, e.g., whether the digital check is in a state that the second transaction can be performed. For example, if the first token (or other tokens of the digital check) indicates that the check is not yet deposited or not yet signed, and the second transaction is settling the check in the clearing house, then the process may forbid the second transaction from taking place. If the check is ready for the second transaction, the process proceeds to 950. If the check is not ready for the second transaction, the process generates (at 945) a report regarding the failed second transaction and the process 900 terminates.

The process stores (at 950) a second non-fungible token of the digital check into the distributed ledger. The second token includes (i) the set of parameters of the digital check and (ii) the second service data. The first token may be stored in a first block of the blockchain and the second token may be stored in a second block of the blockchain, where the second block is added to the blockchain after the first block. The process 900 then ends.

The first token may be generated by a first computing device and the second token is generated by a second, different computing device. For example, the first computing device may be one that is used by the payor (e.g., 102) to prepare and sign the digital check and the second computing device is used by the payee (e.g., 104) to receive the digital check. In some embodiments, the second computing device (or the payee's computing device) also receives an authorization code as a one-time password that is required to access (open, view, use, or process) the digital check. In some embodiments, the authorization code is generated by the software stack 700 of the customer app 810 used by the payor.

The first computing device may also be one that is used by the payee (e.g., 104) of the digital check to present the digital check to a bank, while the second computing device is one that is used by the bank (e.g., 120) to receive the digital check. In some embodiments, when the check date in the set of parameters of the digital check is after a current date (i.e., the check is a post-dated check, or PDC), the second computing device (of the bank) warehouses the digital check at the bank and delays sending the digital check to a clearing house for settlement. In some embodiments, the second computing device (of the bank) may credit an amount to an account of the payee at the bank that is discounted from the amount in the set of parameters of the digital check. Warehousing PDCs and providing PDC discounting will be further described by reference to FIGS. 14-15 and 24-25 below.

The first computing device may also be one that is used by a bank (120) to which the digital check is presented by the payee, while the second computing device is one that is used by a clearing house (140) at which the digital check is settled. In some embodiments, when the digital check is a PDC, the second computing device warehouses the digital check at the clearing house and delays settling the digital check until the check date. In some embodiments, the second computing device (of the clearing house) identifies, based on tokens of digital checks in the distributed ledger, a first batch of digital checks and a second batch of digital checks to be settled at different time slots. A timing interval separating a first time slots for settling the first batch of digital checks and a second time slot for settling the second batch of digital checks is configurable. In some embodiments, the second computing device dynamically determines the timing interval based on a network condition and the amount of checks remaining to be netted and settled. Configuring timing intervals between batches of digital checks to be settled (also referred to as settlement intervals) will be described below by reference to FIGS. 10-11.

Net settlement is a payment system used for inter-bank transactions. It is the process by which banks calculate their collective total of all transactions through designated times each day. In an inter-bank payment system using net settlement, debits and credits are recorded and only the difference between the debits and the credits (the net position) is actually paid between the parties. In most payment systems, this netting takes place in a clearing house between the designated settlement times with final settlement of the net positions occurring when funds are debited or credited on its reserve account at a central bank. In short, in a net settlement system, payments are summed up and aggregated at the end of the day, before being paid. This is usually a batched process, so the processing of each check is delayed until its batch is settled.

An alternative to net settlement is Real-Time Gross Settlements System (RTGS), in which each transaction is processed individually and settled with immediate payment. However, this approach results in higher network load due to each check being settled individually and incurring transaction overhead.

In some embodiments, the digital checking system includes a digital check settlement system in which settlement intervals (timing intervals between batches of digital checks to be settled) are configurable from a few seconds to minutes, hours, or days. This facilitates batch processing of digital check that is capable of near real time settlements. This is because the digital checks are represented as digital tokens in the blockchain, so there is no need for check scanning and other conversions. For example, in some embodiments, the clearing house may dynamically adjust settlement interval based factors such as the number of checks waiting to be settled, or on historical or real-time network condition, such that the clearing house may batch more checks (or lengthen the settlement interval) when a network congestion metric is worse than or exceed a certain threshold or batch less checks (or shorten the settlement interval) when network congestion metric is better than or below a certain threshold. In some embodiments, the clearing house app uses application program interface (API) to obtain real time information such as real time network condition, history of netting and settlement of digital checks, etc.

Figure 10:
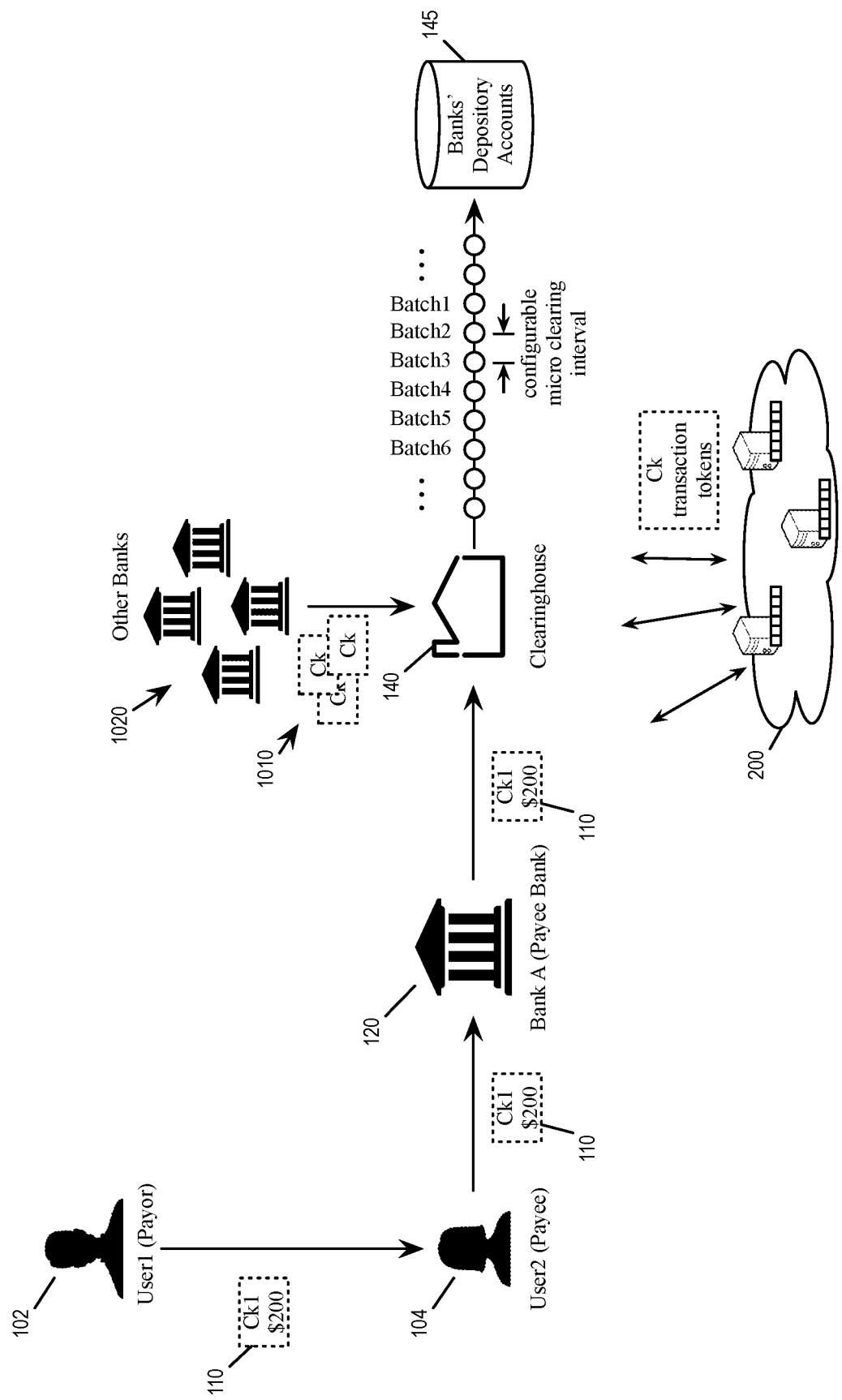
FIG. 10 conceptually illustrates a clearing house performing settlement based on configurable micro-clearing intervals.

FIG. 10 conceptually illustrates a clearing house performing settlement based on configurable micro-clearing intervals. In the example, the payee 104 deposits the digital check 110 that is prepared and signed by the payor 102 at the payee bank 120. The payee bank in turn sends the check 110 to the clearing house 140, which also receives other checks 1010 from other banks 1020. The clearing house 140 in turn perform settlement on the received checks in batches (by debiting and crediting reserved accounts 145 at a central bank), and the interval of time between batches are configurable micro-clearing intervals.

The clearing house app may invoke APIs to obtain various real time information, which may be used to dynamically determine the micro-clearing interval. The micro-clearing interval of digital checks can be set to be small (e.g., seconds) and yet incur very little overhead cost since the digital checks are represented as digital tokens in blockchain so very little or no physical operations of the checks need to be performed.

Figure 11:
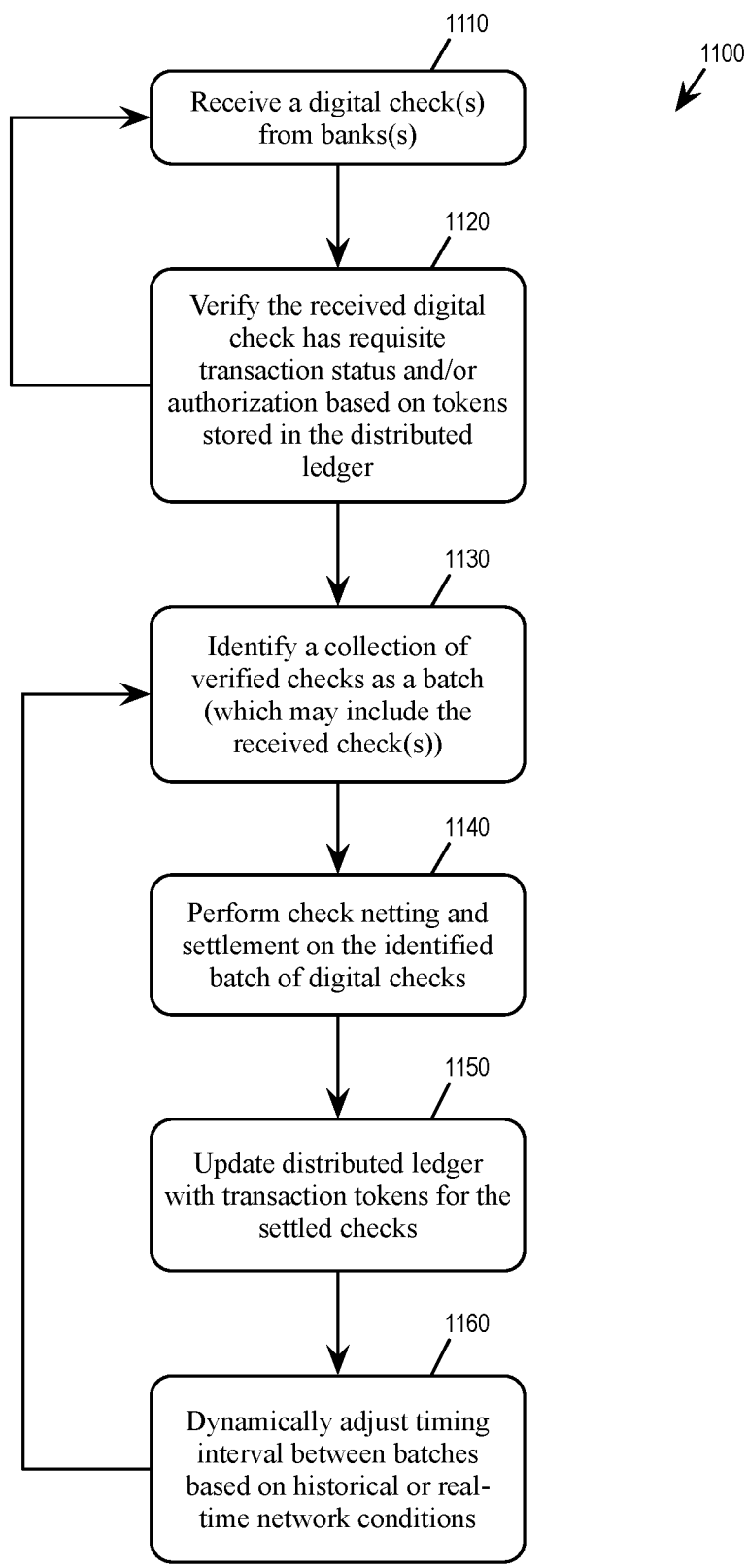
FIG. 11 conceptually illustrates a process for performing net settlement of digital checks.

In some embodiments, the clearing house 140 uses a clearing house application (e.g., the clearing house app 830) running on a computing device for accessing the distributed ledger 210 and processing digital checks. FIG. 11 conceptually illustrates a process 1100 for performing net settlement of digital checks. In some embodiments, one or more processing units (e.g., processor) of a computing device implementing the clearing house app performs the process 1100 by executing instructions stored in a computer readable medium.

The clearing house app receives (at 1110) a (notification of) digital check sent to clearing house from a bank. The clearing house app verifies (at 1120) the received digital check has the requisite transactions status and/or authorization based on tokens stored in the blockchain or the distributed ledger. The process may return to 1110 to receive and verify more digital checks. The process may also proceed to 1130.

At 1130, the clearing house app then identifies (at 1130) a collection of verified checks as a batch, which may include the received digital checks. The clearing house app performs (at 1140) check netting and settlement of the identified batch of digital checks. The clearing house app also updates (at 1150) the distributed ledger with transaction tokens for the settled batch of checks. The clearing house app may also set (at 1160) or adjust timing interval between batches dynamically based on historical or network conditions. The network condition may be obtained through APIs. In some embodiments, the timing interval between batches is fixed and not dynamically adjusted. The process 1100 may return to 1130 to perform netting and settlement for another batch of digital checks.

In some embodiments, the digital checking system also provide support for post-dated checks (PDCs). A dated check is a one drawn on the same date it was written, while a PDC is one which is drawn with a date which is after the date on which it was written. PDCs cannot be deposited right away and are stored in a secured place prior to depositing. Banks provide a service for safekeeping post-dated checks called PDC warehousing. Physical PDCs carries a risk of loss during transit, storage, handling, or even due to theft. Management, handling, and monitoring of PDCs are not trivial, as management of physical PDCs may require keeping track of maturity dates, depositing checks on their maturity dates, canceling checks, providing security and control, monitoring the status of all checks, and generating management reports.

In some embodiments, in the digital checking system, both dated checks and PDCs are represented as digital tokens in the distributed ledger as described above. Digital PDCs do not require the customer to submit the physical check or image of the check and can be stored in secure servers in their native digital forms. In some embodiments, the digital checking system includes a Digital PDC warehousing system, which is an automated process executed by smart contracts in the distributed ledger for managing, handling, and monitoring PDC.

Digital PDC warehousing can be done in a centralized way by a single provider like the Clearing House. Digital PDC warehousing can also be done in a decentralized way, e.g., by banks at which the checks are presented for deposit (e.g., the payee bank 104.) In some embodiments, Digital PDC warehousing can be done in a hybrid way that is both centralized and decentralized.

Figure 12:
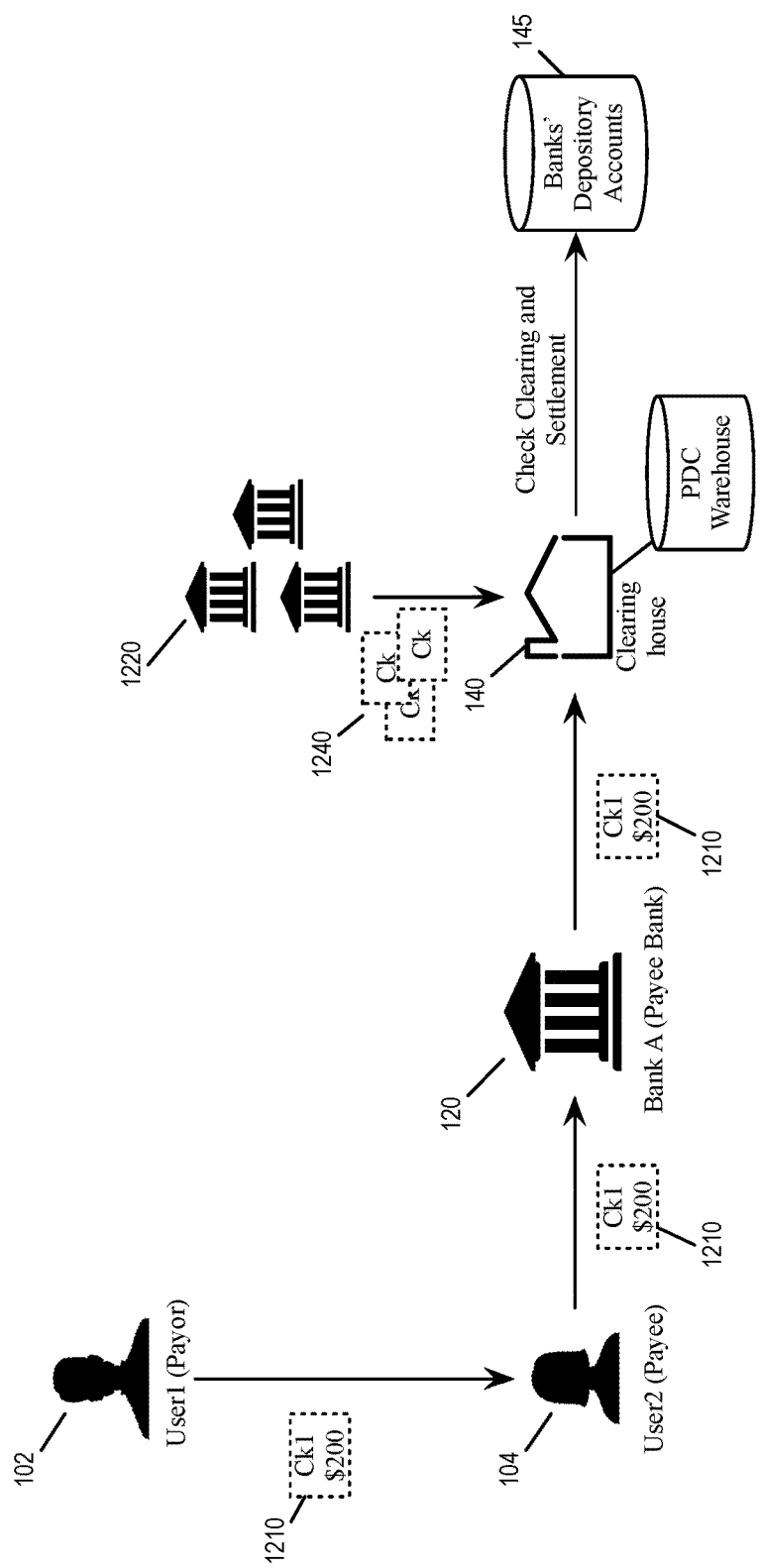
FIG. 12 illustrates centralized PDC warehousing of digital checks.

FIG. 12 illustrates centralized PDC warehousing of digital checks. In the example, the payee 104 deposits a digital check 1210 that is prepared and signed by the payor 102 at the payee bank 120. The digital check 1210 is a PDC that specify a maturity date later than the current date (e.g., when the date field 431 in transaction data 430 of the token 401 is later than the current date). The payee bank in turn sends the check 1210 to the clearing house 140, which also receives other checks 1240 from other banks 1220. The clearing house 140 uses the distributed ledger to verify the maturity dates of the PDCs and warehouses each PDC until the maturity date of the PDC has arrived. For each matured PDC, the clearing house 140 performs check netting and settlement as described above by reference to FIG. 10-11.

Figure 13:
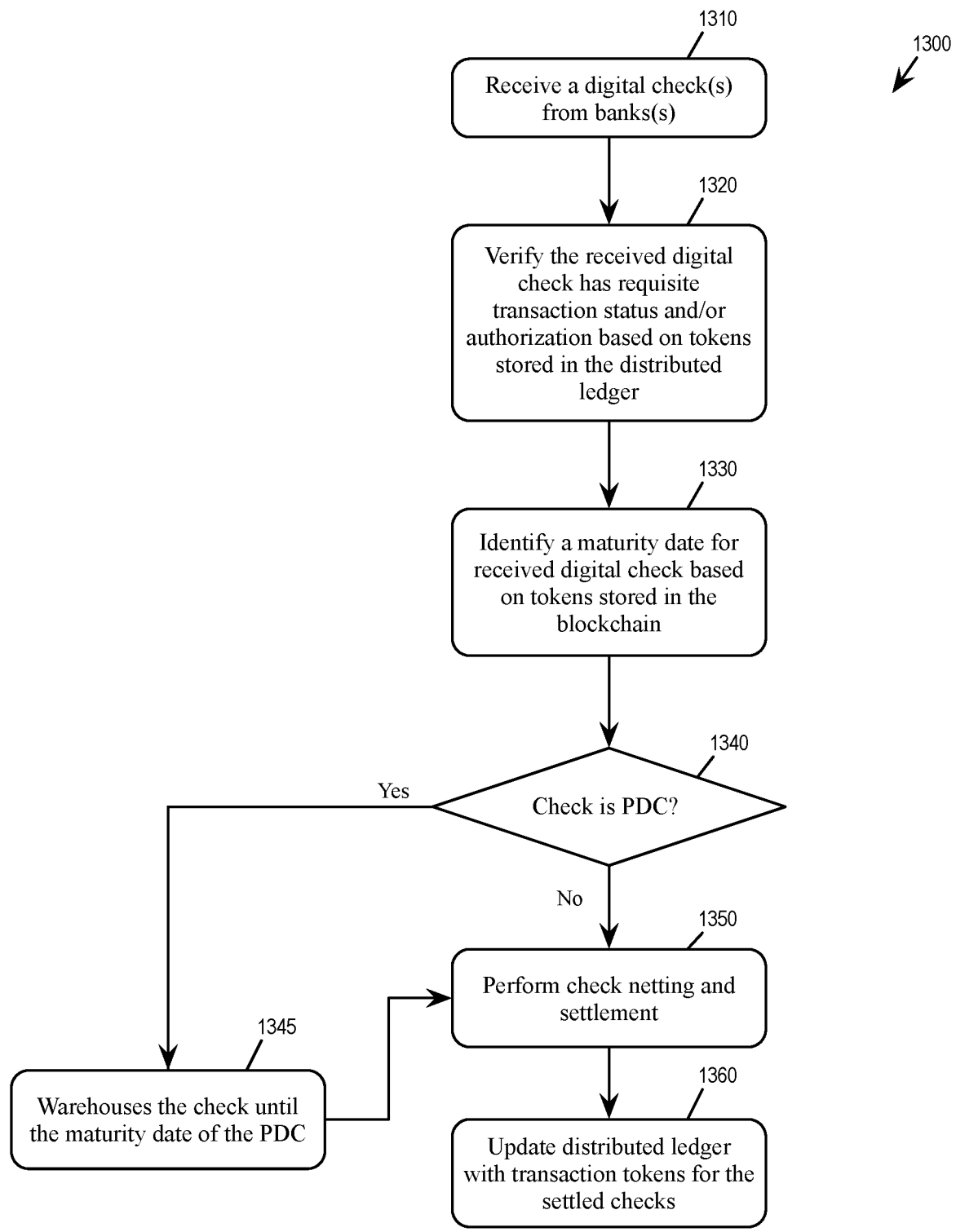
FIG. 13 conceptually illustrates a process for performing centralized PDC warehousing.

FIG. 13 conceptually illustrates a process 1300 for performing centralized PDC warehousing. In some embodiments, one or more processing units (e.g., processor) of a computing device implementing the clearing house app (e.g., the clearing house app 830) performs the process 1300 by executing instructions stored in a computer readable medium.

The clearing house app receives (at 1310) a (notification of) digital check sent to clearing house from a bank. The clearing house app verifies (at 1320) the received digital check has the requisite transactions status and/or authorization based on tokens stored in the blockchain or the distributed ledger. The clearing house app identifies (at 1330) a maturity date for the received digital check based on the tokens stored in the blockchain.

The clearing house app then determines (at 1340) whether the check is a PDC based on the maturity date of the check. The clearing house app may examine the date field (e.g., 431) of a token of the digital check in the distributed ledger to determine the maturity date of the check. If the check is not a PDC, the clearing house app proceeds to 1350 to perform check netting and settlement. If the check is a PDC, the clearing house app warehouses (at 1345) the check until the maturity date of the PDC and proceeds to 1350.

At 1350, the clearing house app performs netting and settlement for the check, whether it's a matured PDC or a dated check. The clearing house may perform the checking netting and settlement batch by batch based on micro-clearing intervals as described above by reference FIG. 11. The clearing house app also update (at 1360) the digital ledger with transaction tokens regarding the settled check.

Figure 14:
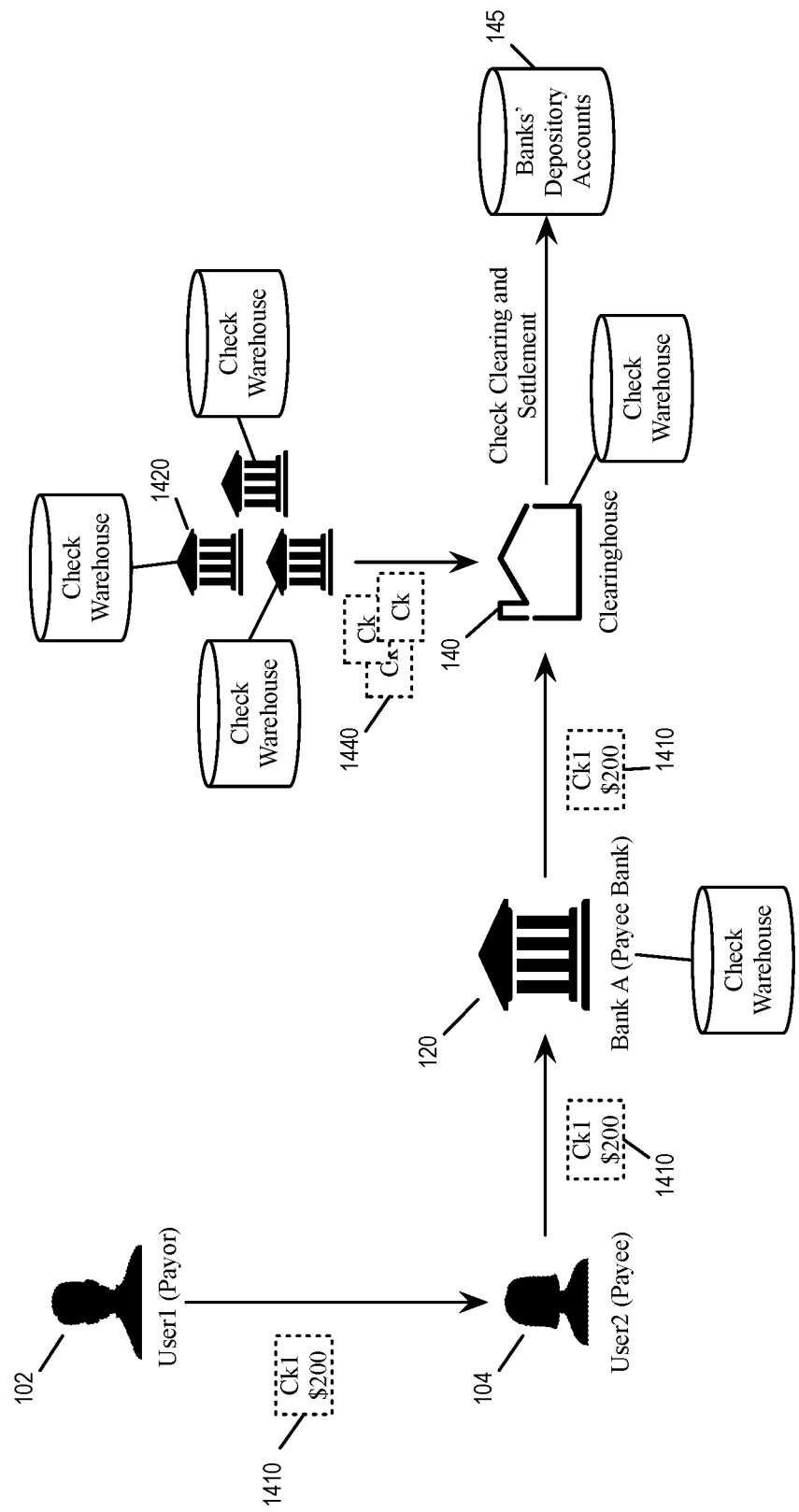
FIG. 14 illustrates de-centralized or hybrid PDC warehousing of digital checks.

FIG. 14 illustrates de-centralized or hybrid PDC warehousing of digital checks. In the example, the payee 104 deposits a digital check 1410 that is prepared and signed by the payor 102 at the payee bank 120. The digital check 1410 is a PDC. The payee bank 120 uses the distributed ledger to verify the maturity dates of the PDCs and warehouses each PDC until the maturity date of the PDC has arrived. The matured PDC 1410 is sent to the clearing house 140, which also receives other checks 1440 from other banks 1420. These other checks 1440 may include matured PDCs and PDCs that have not reached their maturity date. The other banks 1420 may each warehouse PDCs until their maturity dates. The clearing house 140 performs check netting and settlement on matured checks as described above by reference to FIG. 10-11, while warehousing PDCs that have not reached their maturity date as described above by reference to FIG. 12-13.

PDC discounting is a service offered by banks and other financial institutions that allow a customer to take funds against a PDC without waiting for the check to clear. Applying for check discounting is similar to applying for a loan. The approval process is oftentimes slow because of data gaps in the different stages of the approval workflow. In some embodiments, the digital checking system provides a digital PDC discounting service. The processing of PDC discounting from request to approval is streamlined with the use of distributed ledger, which provides the single source of truths and leaves no data gaps. This also allows tracking of all stages of processing a PDC discounting request in real time.

Figure 15:
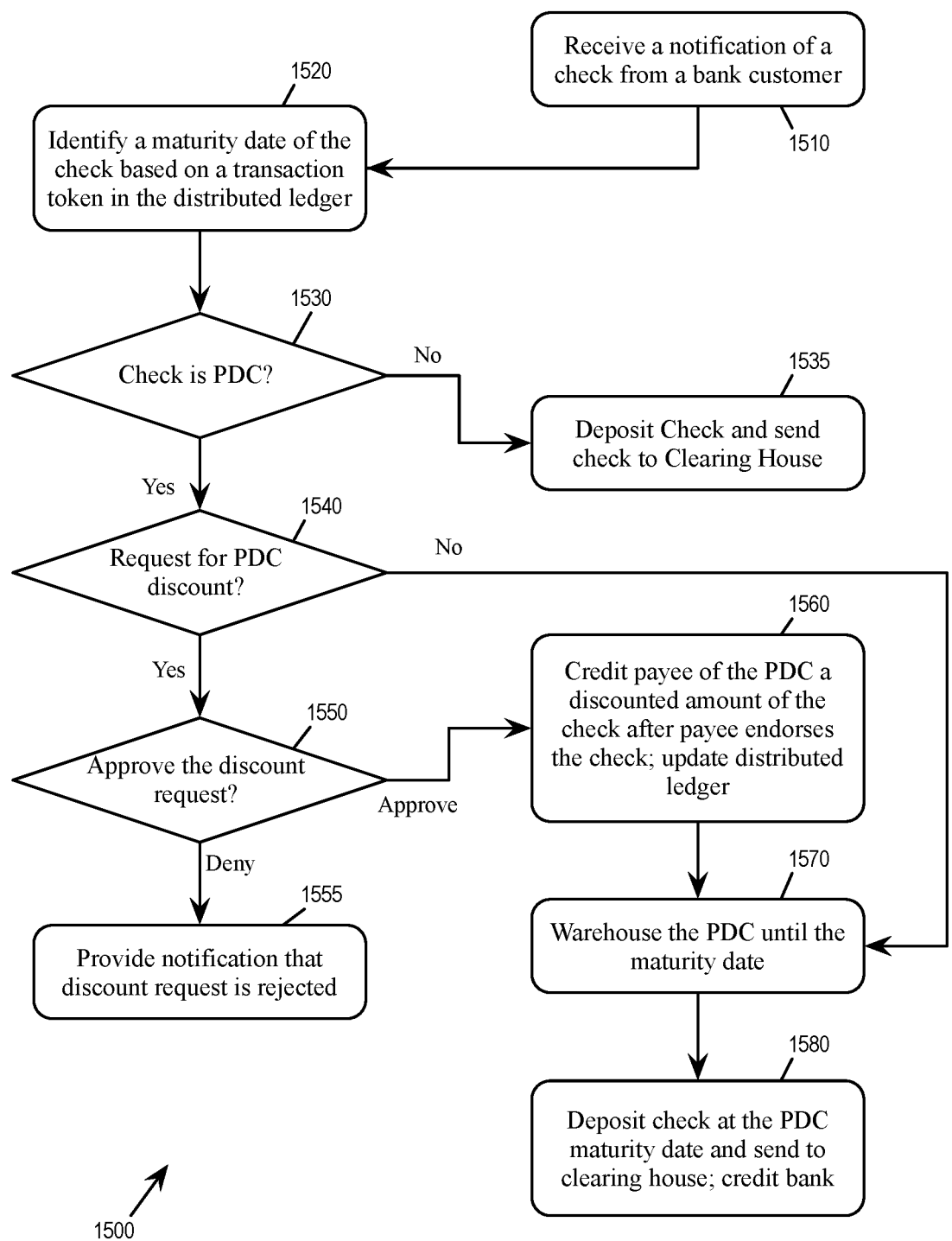
FIG. 15 conceptually illustrates a process for warehousing PDCs by banks.

In some embodiments, a bank application (e.g., the bank app 820) for accessing the blockchain is used to warehouse PDC checks and/or provide PDC discounting. FIG. 15 conceptually illustrates a process 1500 for warehousing PDCs by banks. In some embodiments, one or more processing units (e.g., processor) of a computing device implementing the bank app performs the process 1500 by executing instructions stored in a computer readable medium. In some embodiments, the process 1500 is performed by one or more smart contracts in the software stack of the bank app for accessing the blockchain.

The bank app receives (at 1510) (a notification of) a digital check from a bank customer. The bank verifies that the received digital check has the requisite transactions status and/or authorization based on tokens stored in the blockchain or the distributed ledger. The clearing house app identifies (at 1520) a maturity date for the received digital check based on the tokens stored in the blockchain.

The bank app then determines (at 1530) whether the check is a PDC based on the maturity date of the check. The bank app may examine the date field (e.g., 431) of a token of the digital check in the distributed ledger to determine the maturity date of the check. If the check is not a PDC, the bank app proceeds to 1535. If the check is a PDC, the bank app proceeds to 1540.

At 1535, the bank app deposit the check and send the check to the clearing house. The bank app also records the transaction in the distributed ledger.

At 1540, the bank app determines whether the bank customer had also requested PDC discount. The bank app may receive a request for PDC discounting from a customer app. (Customer app for requesting PDC discounting will be described by reference to FIG. 25 below.) If so, the process proceeds to 1550. If PDC discount was not requested, the process proceeds to 1570.

At 1550, the bank app determines whether to approve or reject the PDC discount request. The bank app may evaluate (or perform due diligence on) the digital check based on the transaction tokens of the digital check in the distributed ledger and on account information of the payer and payee. If the bank app approves the discount request, the process proceeds to 1560. If the bank rejects the discount request, the bank app provides (at 1555) notification to the customer user that the discount request is rejected.

At 1560, the bank app credits the payee of the check a discounted amount after the payee endorses the check. The payee may endorse the check as a transaction token and the bank app may verify the endorsement by checking the distributed ledger. The bank app may also record the amount credited to the payee on the PDC in the distributed ledger as a transaction token. The process then proceeds to 1570.

At 1570, the bank app warehouses the PDC until the check's maturity date. In some embodiments, the bank warehouses a PDC by storing only the check's identifying and authenticating information, as all other information of the check are already stored in the distributed ledger. The bank app deposits (at 1580) the check at the check's maturity date and sends the check to the clearing house to be cleared (netted and settled). The bank app also generates and stores corresponding tokens for transactions in the distributed ledger. Once the check is settled by the clearing house, the bank (not the payee) will be credited the full amount of the check.

In some embodiments, the digital checking system 100 provides user interfaces for the customer app 810, the bank app 820, and the clearing house app 830. The user interface is used by the digital checking system 100 to display information regarding the digital checks and to receive user input for various transactions involving digital checks. The software stack 700 uses the received data to perform the transactions and to record the transactions as tokens of the digital checks in the distributed ledger 210.

Figure 16:
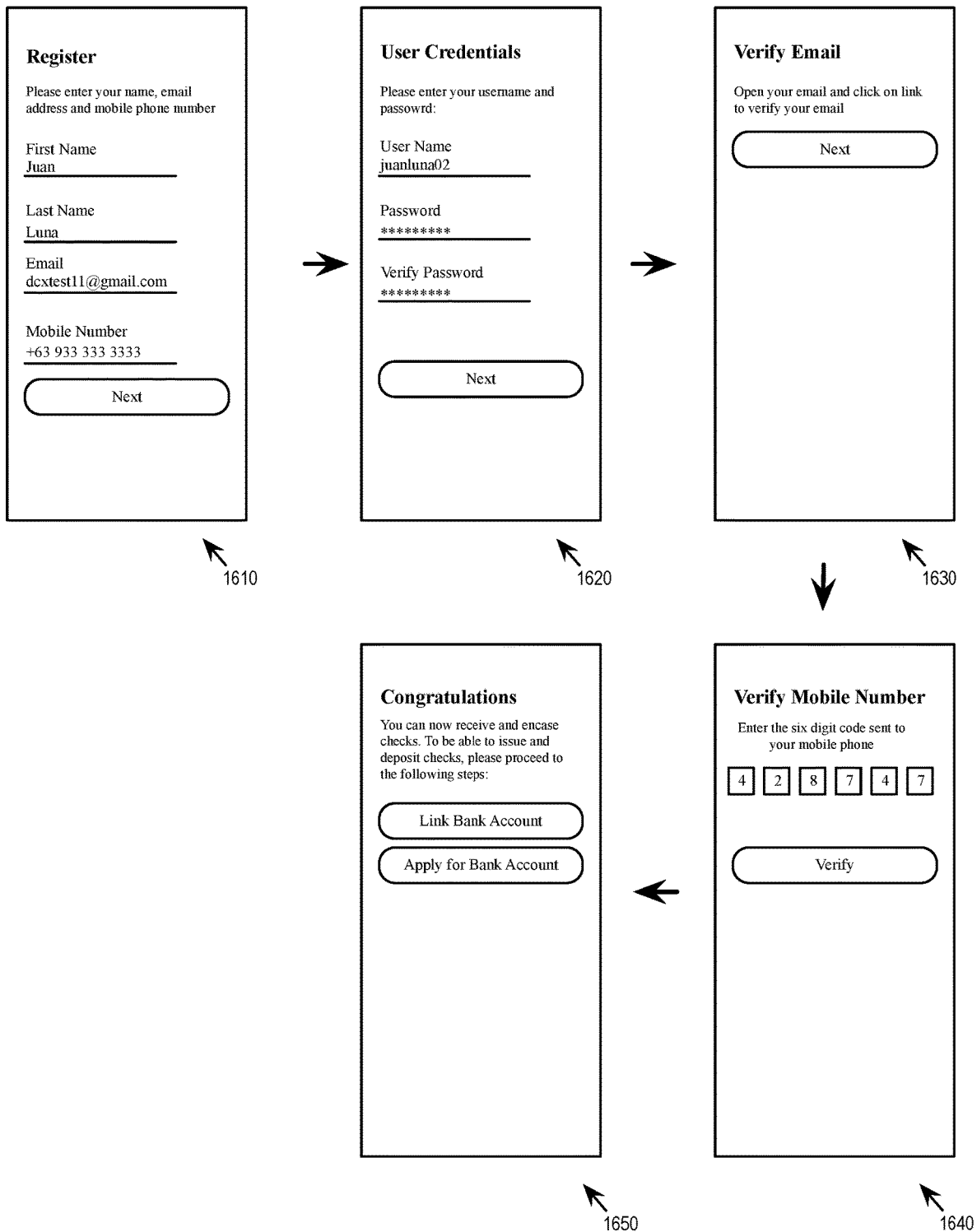
FIG. 16 illustrates the user interface of the digital checking system for user registration.

In some embodiments, the user interface of the digital checking system 100 presents various graphical user interface (GUI) elements for presenting information to the user and for receiving data from the user. FIG. 16 illustrates the user interface of the digital checking system for user registration. The user registration procedure is for signing up a user to the digital checking system. After this step, the user can log in to a mobile app or a web application using the same username and password. The mobile app can be downloaded from an online application store. The figure illustrates several GUI elements 1610-1650 that correspond to steps in the user registration process.

The GUI element 1610 is for receiving basic user information (name, email address, phone number etc.) The GUI element 1620 is for receiving user credentials (username and password). The GUI element 1630 is for verifying email for confirm registration. The GUI element 1640 is for verifying mobile number. The GUI element 1650 is for confirming to user that the registration is successful and to invite the user to link his bank account to the application.

Figure 17:
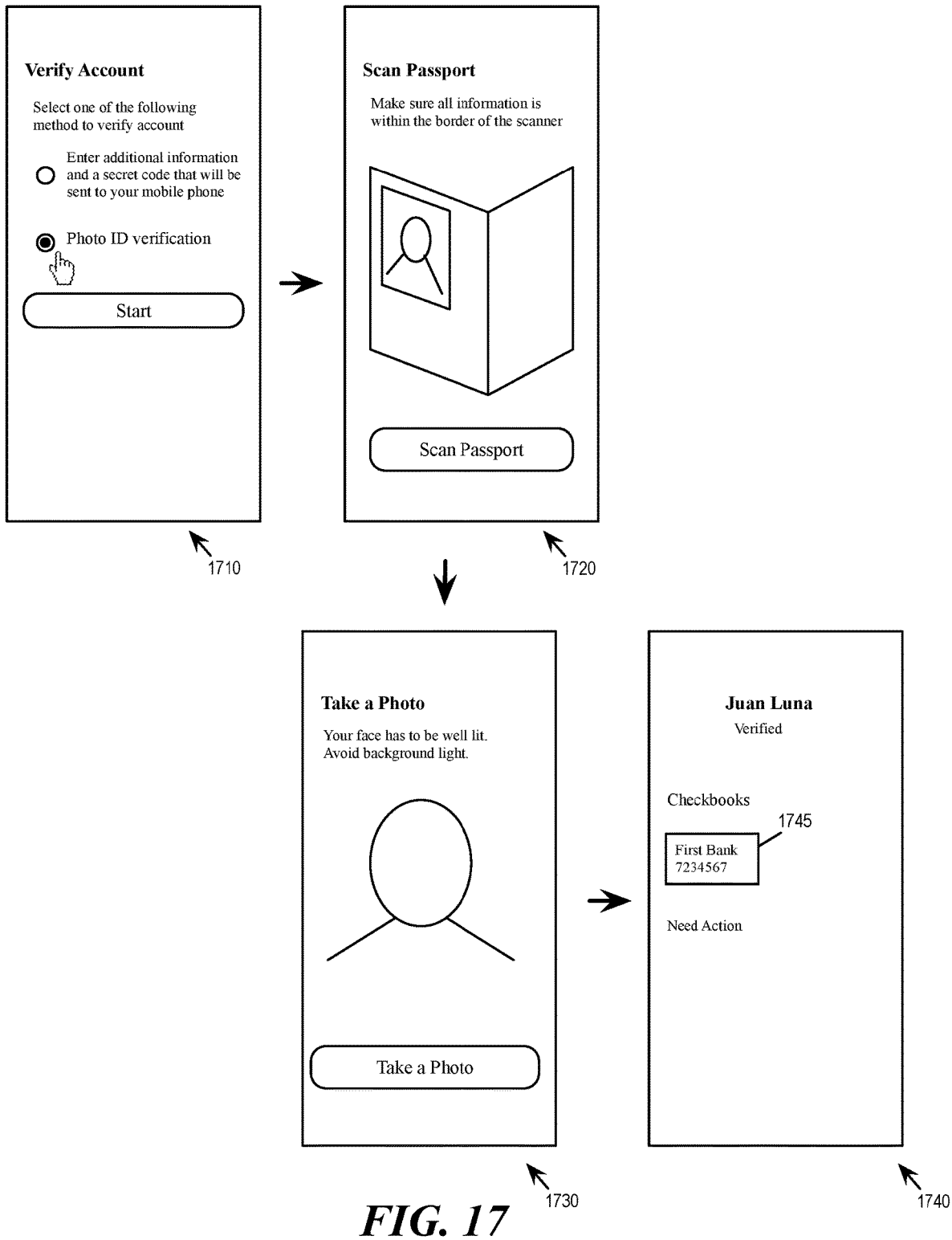
FIG. 17 illustrates the user interface of the digital checking system for verifying a bank account and for creating a digital checkbook that is linked to the account.

FIG. 17 illustrates the user interface of the digital checking system for verifying a bank account and for creating a digital checkbook that is linked to the account. A digital checkbook is the electronic version of a paper checkbook. After the user links a bank account in the app, a digital checkbook will be created a digital checkbook for the user. The account verification process is configurable per bank. A bank can choose from any of the available self-service verification methods, such as photo ID or account balance verification. The figure illustrates several example GUI elements 1710-1740 that correspond to steps for account verification and for digital checkbook creation.

The GUI element 1710 is for the user to select a method of verification. In the example, photo ID method is selected as first verification step. The GUI element 1720 is for taking a photo of the photo ID (passport). The GUI element 1730 is for taking an actual photo of the user as a second verification step. The GUI element 1740 is for showing that, after the user has successfully linked his or her account to the digital checking system, a digital checkbook 1745 appears in the GUI for the linked account.

Corporate customers can create business checks from their mobile app or from a web portal. Unlike personal checks, business checks can have multiple signatories. In some embodiments, the digital checking system allows a company to set up business checking by creating an authorization matrix that defines the signatory policy of the company. Each signatory is associated with a set of signatory information, such as a user role and a signatory level. This allows the signatory policy to apply limits on when a signatory has the authority to prepare a check on behalf of the corporate customer (e.g., only when a signatory is of a particular role or is higher than a particular level is the signatory allowed to prepare and sign checks greater than a certain amount.)

Figure 18:
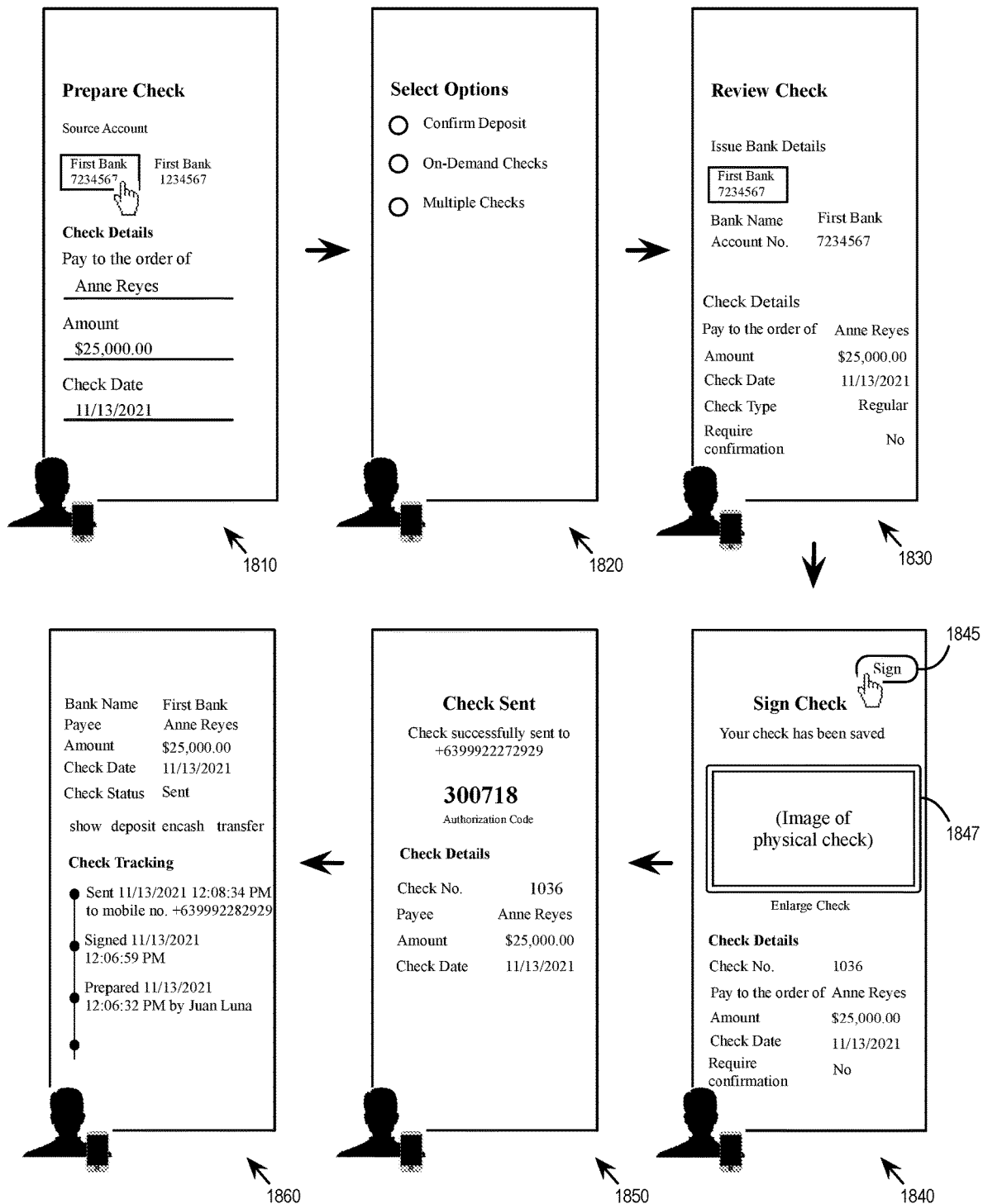
FIG. 18 illustrates the user interface of the digital checking system for issuing a digital check.

FIG. 18 illustrates the user interface of the digital checking system for issuing a digital check. In some embodiments, the GUI elements are used to receive data from a payor for issuing a digital check. The received data may include bank identifier (bank name or bank code), payee, amount, check date, and check number, and a user signature. These are data used for specifying the check data (e.g., 420) and the transaction data (e.g., 430) of transaction tokens. The figure illustrates several example GUI elements 1810-1860 that correspond to steps for issuing a digital check by a payor.

The GUI element 1810 is for preparing the check. This GUI element lets the user select a checkbook of an account (account no. 7234567 in the example) and specify payee name, amount, check date, and optional particulars or notes. In some embodiments, the customer app generates and records the preparation of the digital check in the distributed ledger with a token (e.g., the token 501).

The GUI elements 1820 is for selecting options for the check. A user may request to confirm deposit of the check, issue the check to be an on-demand check (a check that can clear in a few minutes), or issue multiple checks automatically, including PDCs. The GUI elements 1830 is for the user to review and verify that all data entries of the check are correct.

The GUI element 1840 is for signing the check. The user may tap a sign button 1845 to digitally sign the check, or provide username and password, or use the smartphone's biometric features. The GUI element 1840 also displays a representation 1847 of a physical check that correspond to the digital check to be issued. In some embodiments, when the "sign" button 1845 is selected, the application generates a digital user signature (e.g., 434B, based on a private key of the payor) and applies the digital signature to the digital check. In some embodiments, the customer app generates and records the signing of the digital check in the distributed ledger as a token (e.g., the token 502).

The GUI element 1850 is for sending the check to the payee. The GUI element lets the user fill in the payee's mobile number. An authorization code (e.g., OTP) will be sent via SMS to the payee at the mobile number. The authorization code will be used by the payee to access the check. In some embodiments, the customer app generates and records the sending of the digital check in the distributed ledger as a token (e.g., the token 503).

The GUI element 1860 lets the user view the check's transaction history from the creation and preparation of the digital check up to the latest transaction. The customer app 810 may construct this history from the transaction tokens of the check in the distributed ledger. The GUI element 1860 also includes selectable UI elements for performing other digital check transactions (e.g., "show", "deposit", "cash", "transfer"). Once the digital check is issued, digital signatures, user roles and entitlements, authorization codes, confirmation prior to deposit, one-time passwords, and other data collected by the GUI elements may be used to ensure security of each subsequent transaction.

Figure 19:
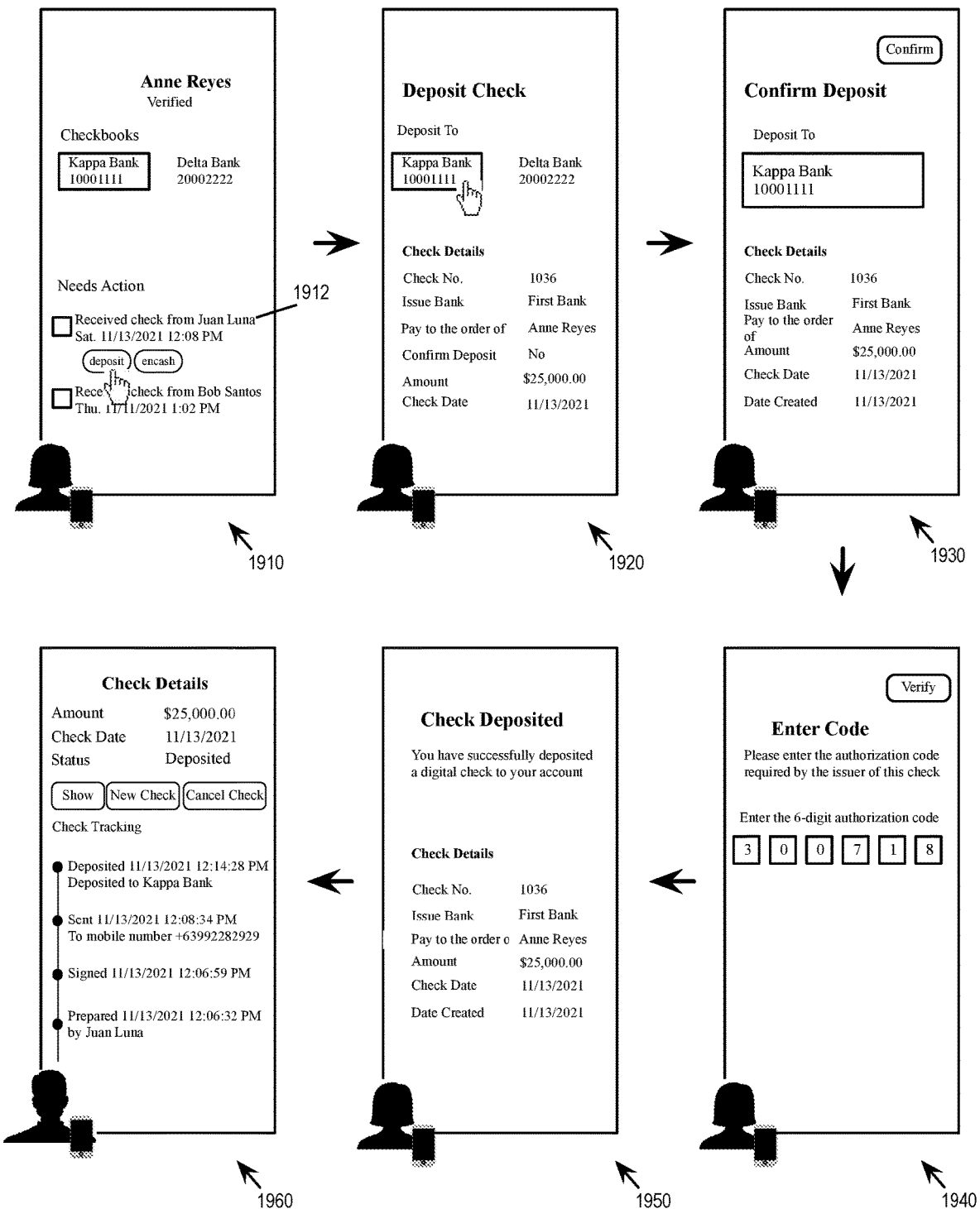
FIG. 19 illustrates the user interface of the digital checking system for depositing a digital check.

FIG. 19 illustrates the user interface of the digital checking system for depositing a digital check. Since the checks are digital checks that are represented by tokens in a distributed ledger, there is no need for photographing the deposited check or entering check details manually. The figure illustrates several example GUI elements 1910-1960 that correspond to steps for depositing a digital check.

GUI element 1910 is a digital checking home page, which may provide alerts of checks issued to the user. In this example, an alert 1912 notifies the user regarding an incoming digital check. The user may select to either deposit or encash the digital check. In this case the user selects depositing the check.

GUI element 1920 lets the user select the bank account where he or she wants to deposit the check. In the example, an account "10001111" in "Kappa Bank" is selected. GUI element 1930 is for the user to confirm the details of the digital check being deposited. In some embodiments, the customer app generates and records the viewing of the digital check in the distributed ledger as a token (e.g., the token 504).

GUI element 1940 lets the user (payee) enter the authorization code of the digital check provided by the payor through SMS. GUI element 1950 is for showing that the check has been deposited to the selected bank account. In some embodiments, the customer app generates and records the depositing of the digital check in the distributed ledger as a token (e.g., the token 505).

GUI element 1960 shows the check's transaction history from the time the check was created up to the latest transaction. In some embodiments, this GUI element is shown to the payor when the payor wants to view the status of the issued check. The customer app 810 may construct this history from transaction tokens of the check in the distributed ledger.

In some embodiments, a user of the digital checking system may present a digital check to a bank to obtain cash, regardless of whether the user has a bank account or not. The digital check system provide capability for both banked and unbanked payees to encash checks.

Figure 20:
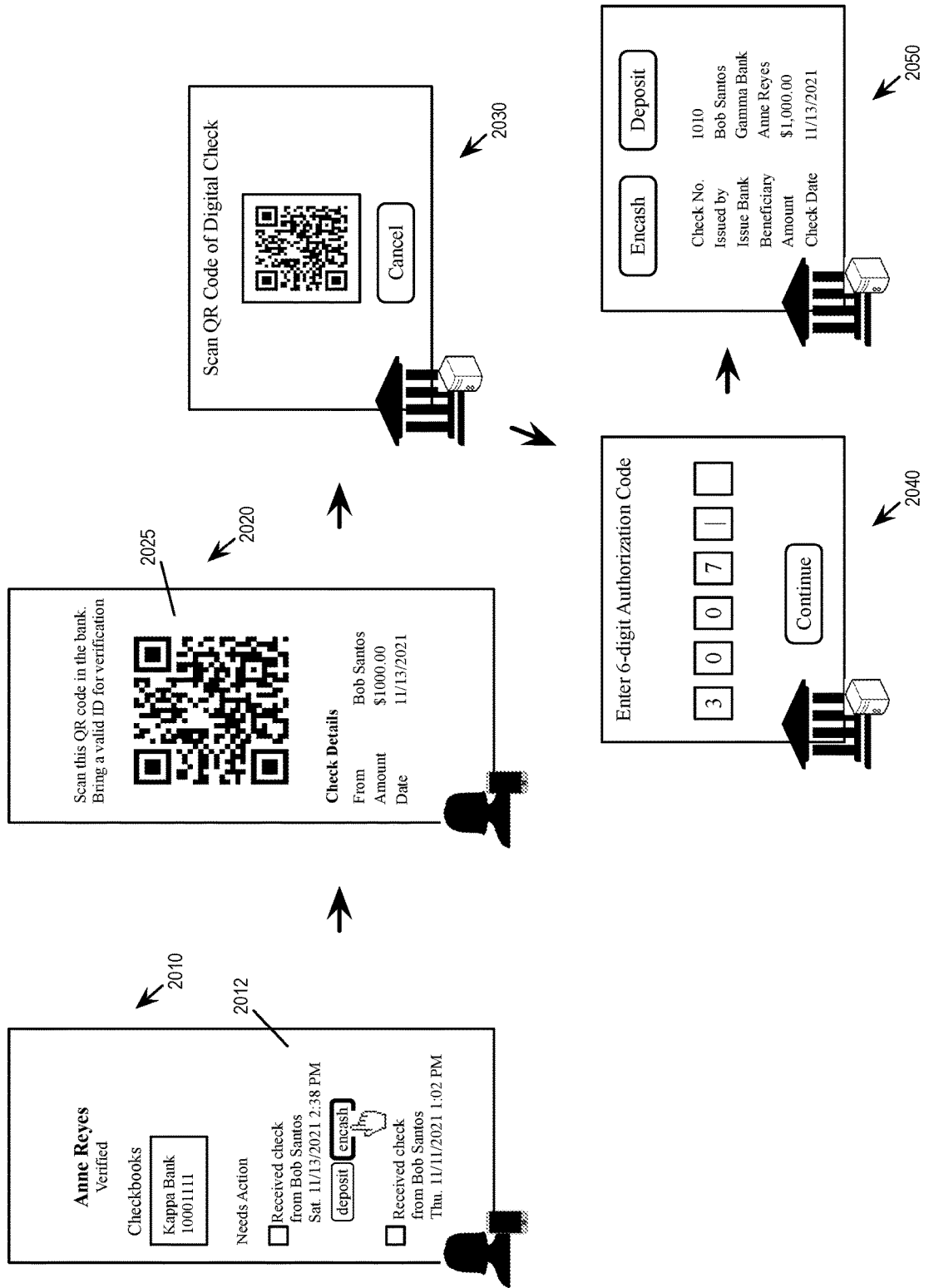
FIG. 20 illustrates GUI elements for encashing checks.

FIG. 20 illustrates GUI elements for encashing checks. The figure illustrates several example GUI elements 2010-2050 that correspond to steps for encashing a digital check. In some embodiments, QR code scanners at banks branches are used to scan digital checks (with QR codes) displayed by the customer app 810 (e.g., as a mobile app). GUI elements 2010-2020 are presented at the customer app to a payee user who is encashing a digital check, while GUI elements 2030-2050 are presented at a bank app to a bank teller.

GUI element 2010 is a digital checking home page, which may provide alerts of checks issued to the user. In this example, an alert 2012 notifies the user regarding an incoming digital check. The user may select to either deposit or encash the digital check. In this case the user selects encashing the check. After encashing is selected, the customer app 810 presents a QR code 2025 in GUI element 2020. The user may present the QR code to a bank teller in a mobile app.

The teller in turn uses the bank app 820 to accept check for encashment or deposits based on the QR code. GUI 2030 shows the QR code being scanned into the bank app 820. GUI element 2040 lets the teller enters the authorization code of the digital check that was provided by the payor/issuer of the check to the payee. The payee may inform the teller whether the check is to be encashed or deposited. The GUI element 2050 shows the details of the check and lets the teller selects whether to deposit the check into an account at the bank or the encash the check. If the check is to be encashed, the teller requests valid ID from the payee. Upon successful verification by a bank officer, the teller gives the funds to the payee. If the check is to be deposited, the bank teller enters account number and deposits the check. The bank app 820 records the transaction as a token in the distributed ledger as either encashment or deposit.

Figure 21:
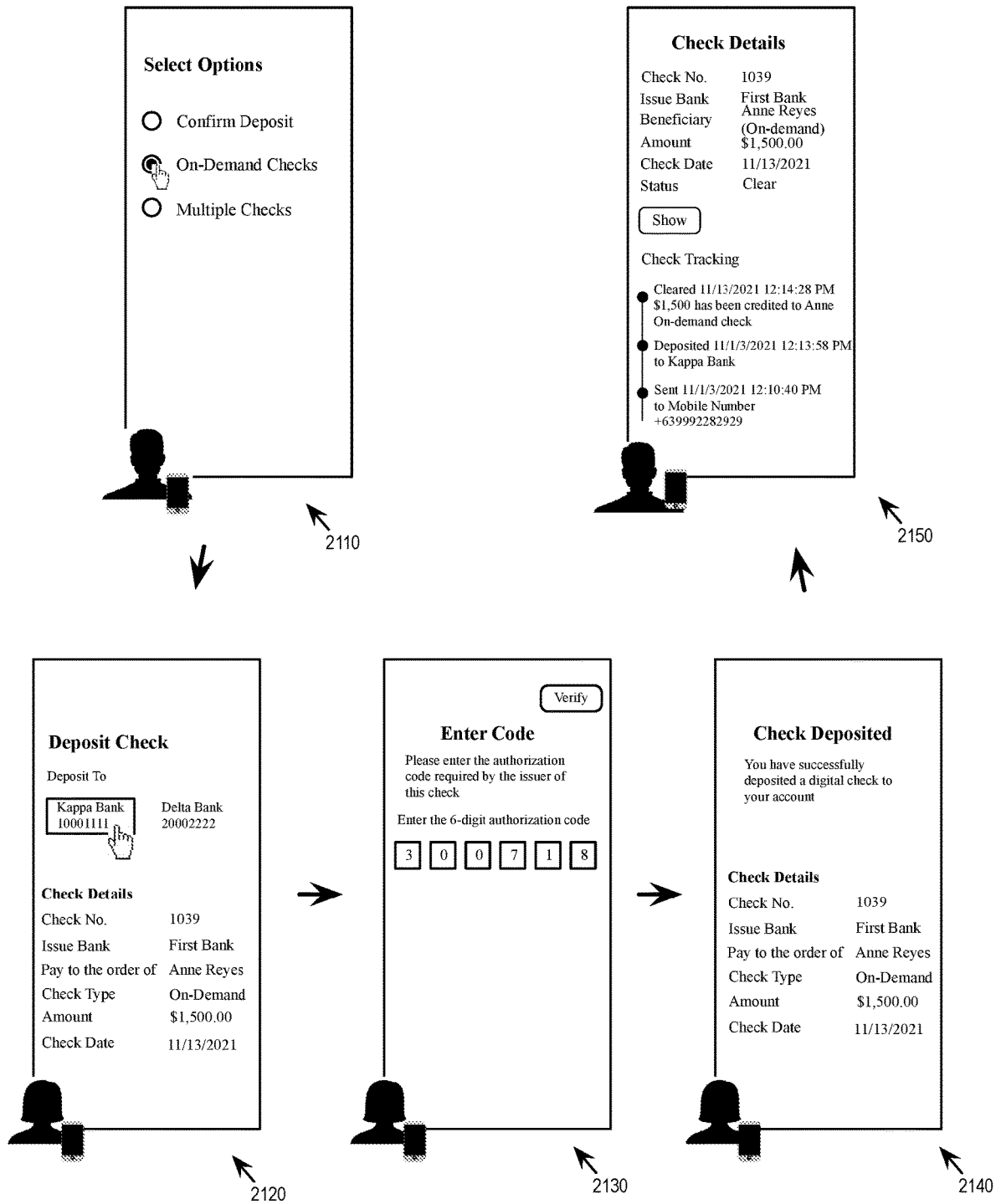
FIG. 21 illustrates the user interface of the digital checking system for issuing on-demand checks.

FIG. 21 illustrates the user interface of the digital checking system for issuing on-demand checks. On-demand checks, unlike regular checks, use straight through processing that results in a much faster clearing cycle than regular checks such that it can clear in just a few minutes. The figure illustrates several example GUI elements 2110-2150 that correspond to steps for issuing an on-demand digital check.

In the example, a payor user has already prepared the check (by e.g., using GUI element similar to 1810). GUI element 2110 is a selection option screen for the payor user to select whether to prepare the check like any regular check, or as an on-demand check. In the example the user has chosen on-demand check. The payor user may then sign and send the check (by e.g., using a GUI element similar to the GUI element 1840) to the payee user.

GUI element 2120 is for the payee user to deposit the check and review its details. GUI element 2130 is for the payee user to enter the authorization code of the check. GUI element 2140 is for showing to the payee user that the check has been deposited. At this point the customer app 810 may record the deposit transaction into the distributed ledger. After the check is deposited, the GUI element 2150 shows the check's transaction history for viewing by the payor user. Notice that the on-demand check has a shorter cycle than regular checks.

Figure 22:
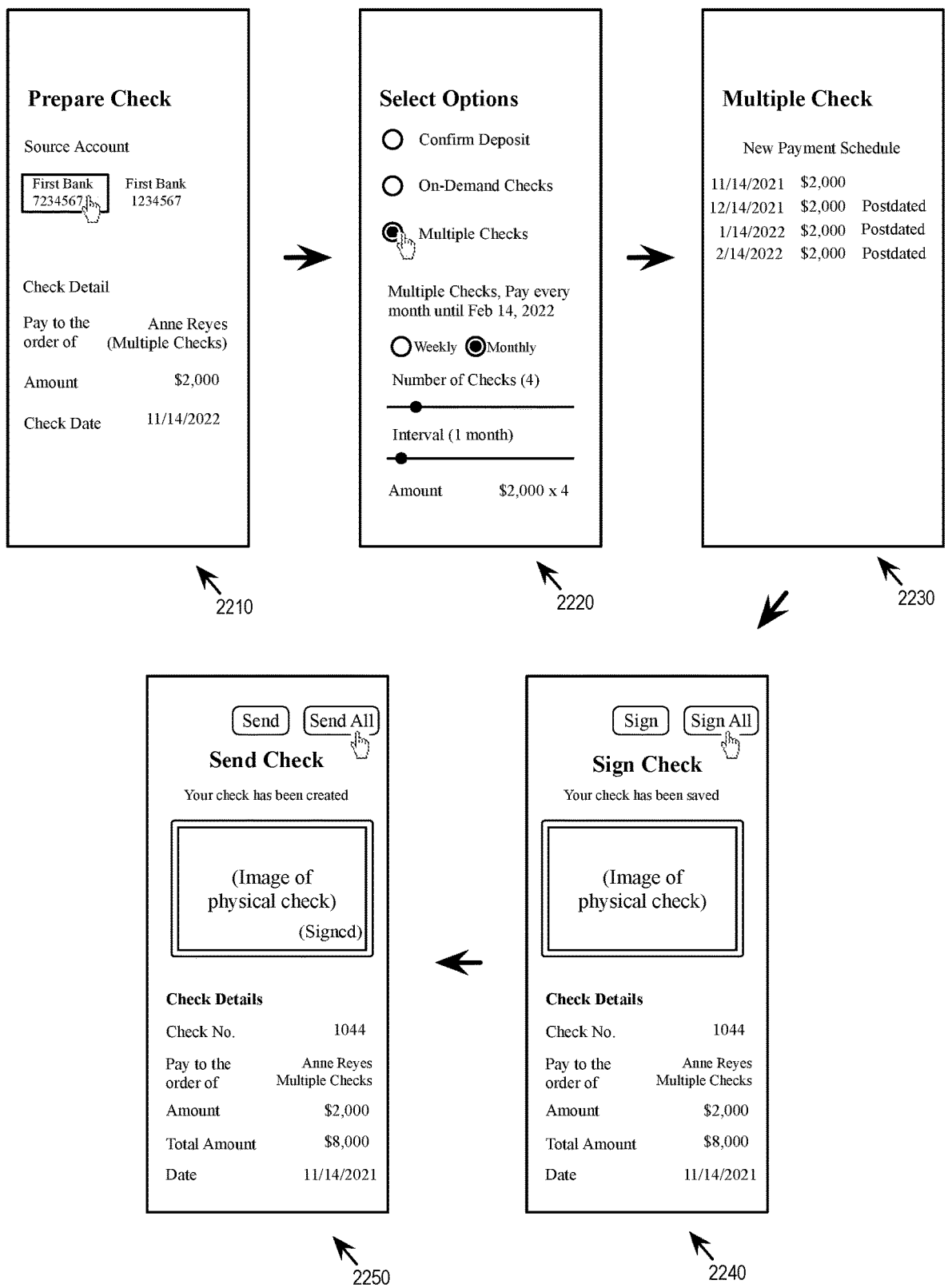
FIG. 22 illustrates the user interface of the digital checking system for issuing multiple checks.

FIG. 22 illustrates the user interface of the digital checking system for issuing multiple checks. The user interface of the digital checking system can be used to prepare and send or to schedule (recurring) multiple checks. GUI elements 2210-2250 correspond to steps for issuing multiple digital checks.

GUI element 2210 is for preparing checks by specifying amount, payee name, and check date. GUI element 2220 provides the option of issuing multiple checks and allowing the user to enter the number of checks to issue, the interval in weeks or months between checks to be issued. GUI element 2230 provides a summary of the multiple checks that are being issued, allowing the user to review the issuance schedule of the checks (in the example is once a month for four months.) GUI element 2240 lets user sign each check individually or all together as a batch. GUI element 2240 lets user sends each check individually or all together as a batch. The customer app 810 of generates and records each transaction (the preparation, the signing, and the sending) of each check as a token in distributed ledger.

Corporate customers can use either mobile or web app to issue and deposit checks. Checks can be signed individually or in batches, and by one of multiple registered signatories in the authorization matrix of the corporate customer. A signatory may enter check detail (by using e.g., the GUI element 1810), sign the check (by using e.g., the GUI element 1840 or the GUI element 2240), and send the check the recipient's/payee's mobile phone or email. The payee may enter the authorization code to deposit the check (by using e.g., the GUI element 1940). The customer app 810 (as a mobile app or a web app) of the corporate customer may record each transaction of each digital check as a token into the distributed ledger. Such a token would also record the identity of the signatory of the digital check.

Figure 23:
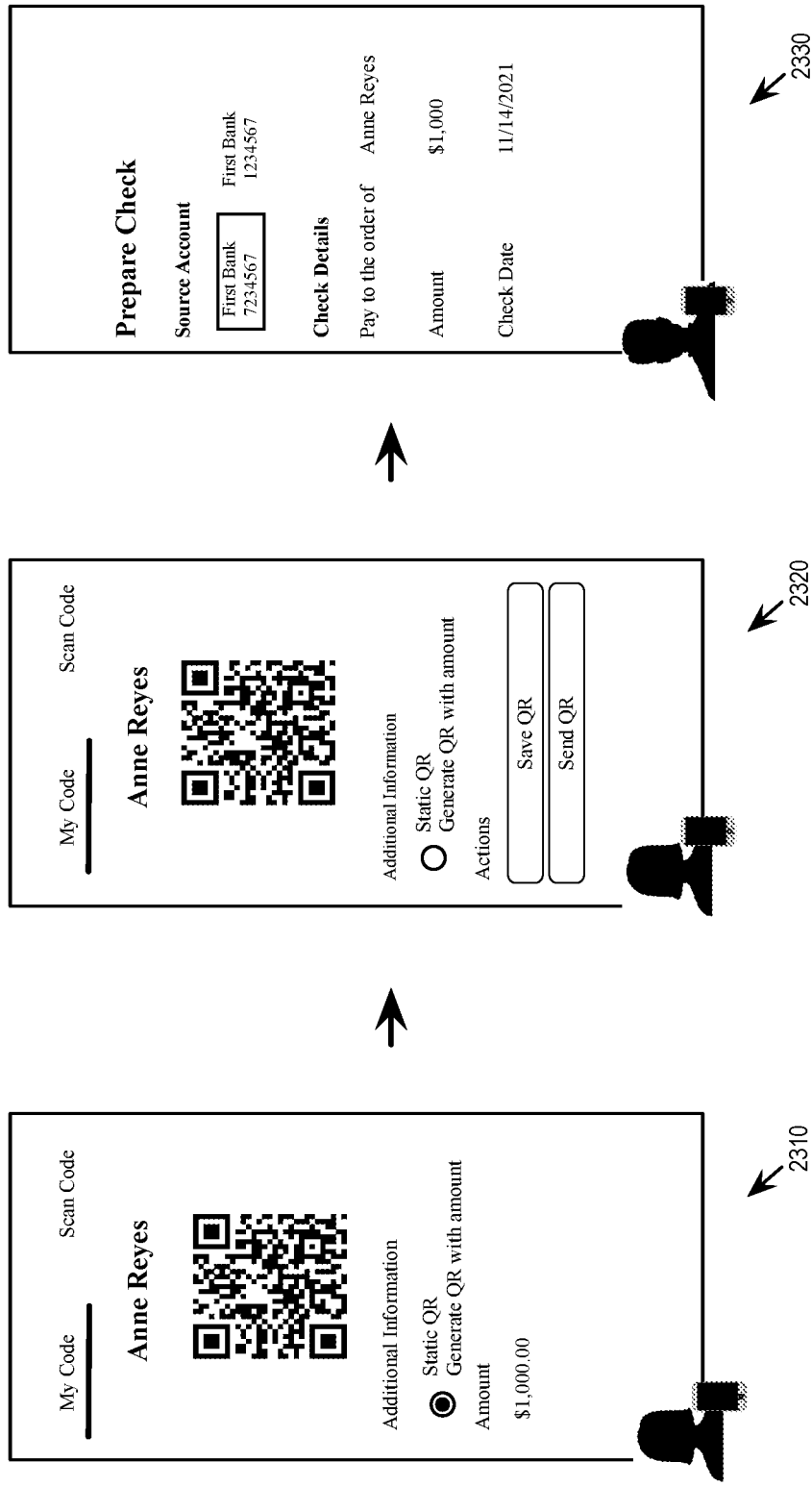
FIG. 23 illustrates the user interface of the digital checking system for a payee to request a digital check from a payor.

In some embodiments, a first user of the digital checking system may request payment by a digital check from a second user of the digital checking system. For example, the first user may generate a QR code specifying the parameters of the requested check (amount, payee, check date, etc.) with his or her mobile app. When the second user receives the QR code, the second user is invited to prepare, sign, and send the requested check to the first user (thus the first user is requesting to be the payee and the second user is requested to be the payor). FIG. 23 illustrates the user interface of the digital checking system for a payee to request a digital check from a payor.

The figure illustrates several example GUI elements 2310-2330 that correspond to steps for requesting a digital check for payment. GUI element 2310 is for the requestor to create a QR code to request payment, based on parameters (amount, payee, date, etc.) provided by the requestor. The GUI element 2320 lets the requestor send the QR code, by either letting the requested payor scan the QR code or by sending the QR code directly to the requested payor's the mobile phone.

Once the requested payor receives the QR code, the payor may use GUI element 2330 in his mobile app to prepare, sign and sends the check to the payee. The parameters of the checking being prepared are already populated based on the received QR code. The customer app 810 of the requested payor also generates and records the preparation, signing, and sending of the digital check in the distributed ledger as a token.

Figure 24:
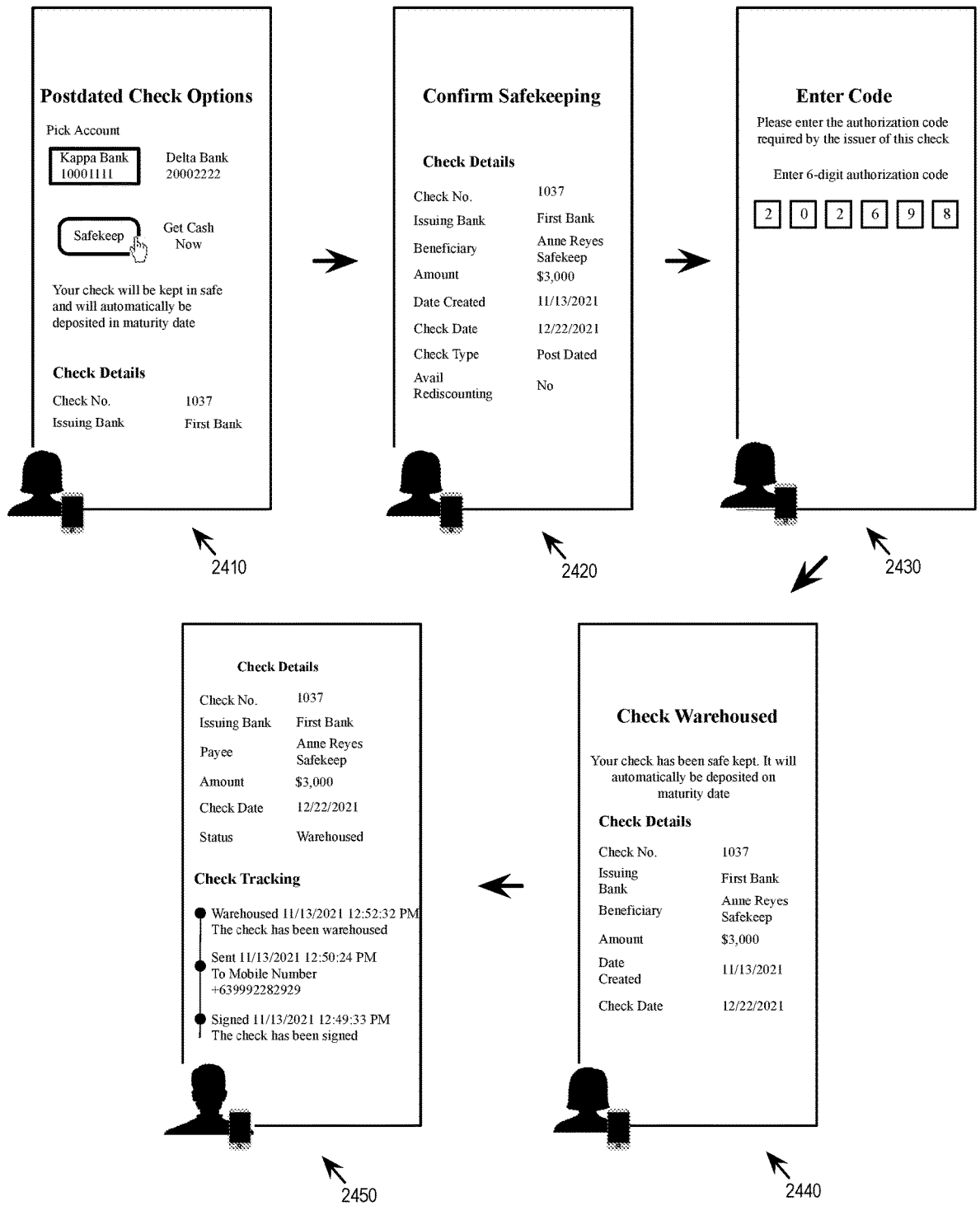
FIG. 24 illustrates the user interface of the digital checking system for warehousing a PDC.

As mentioned earlier, a user of the digital checking system may receive post-dated checks (PDC). In some embodiments, the customer app 810 provides the capability to safekeep a PDC until the PDC's maturity date. FIG. 24 illustrates the user interface of the digital checking system for warehousing a PDC. The figure shows GUI elements 2410-2450 that correspond to steps for receiving and safekeeping PDCs. The check of the example is a PDC because it is dated Dec. 22, 2021 when the current date is Nov. 13, 2021.

GUI element 2410 show the bank providing option for (1) safekeeping the PDC or (2) obtain cash from the bank by a discounted amount. The user selects the safekeeping service for the post-dated check. GUI element 2420 lets the user view the details of the check before proceeding to safekeep or warehouse the check.

GUI element 2430 let the user enter the check's authorization code (provided by the payor). GUI element 2440 is for confirming to the user that the check has been safekept or warehoused, i.e., the bank will not send the check to the clearing house until the check's maturity date (as described above by reference to FIG. 14) or the clearing house will delay clearing the check until the maturity date (as described above by reference FIG. 12.) In the meantime, the bank app 820 or the customer app 810 may record a token in the distributed ledger that the check is being warehoused.

GUI element 2450 is used to provide the check's transaction history from the time the check was created up to the latest transaction. This GUI element can be viewed by the payor or the payee to see the current status of the check. The customer app may construct the transaction history from the transaction tokens in the distributed ledger.

Figure 25:
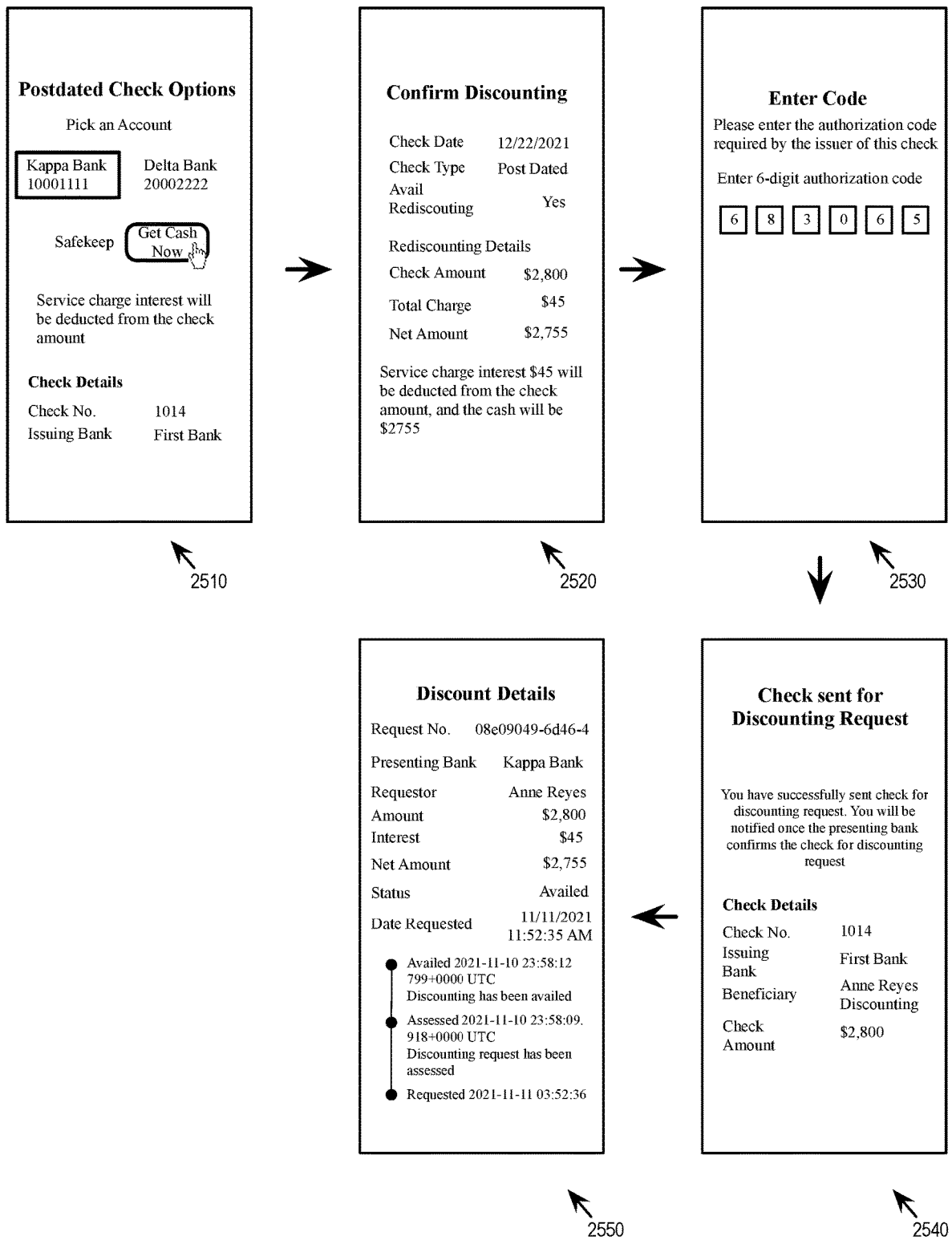
FIG. 25 illustrates the user interface of the digital checking system for discounting a PDC.

Instead of requesting the post-dated check be warehoused, the payee of the check may also request the PDC be discounted. This feature allows the user to take funds against the PDC (at a discount from the check amount) without waiting for the check to clear. FIG. 25 illustrates the user interface of the digital checking system for discounting a PDC. The figure shows GUI elements 2510-2550 that correspond to steps for discounting a PDC.

GUI element 2510 show the bank providing option for (1) safekeeping the PDC ("safekeep") or (2) obtain cash from the bank by a discounted amount ("get cash now"). In the example, the user selected "get cash now". By doing so, the digital PDC will be processed to provide discounted cash to the user. GUI element 2520 lets the user view the details of the check before proceeding to discount the check. GUI element 2530 let the user enter the check's authorization code (provided by the payor). GUI element 2540 is for confirming to the user that the bank will process the discounting request, i.e., the bank will perform due diligence to determine whether it should fund payee before the maturity date, and if it does, pay the user a discounted amount while warehousing the check until the maturity date. And when the check is cleared by the clearing house, the bank will be credited with the check amount (as described by reference to FIG. 15 above.) In the meantime, the bank app 820 or the customer app 810 may record tokens in the distributed ledger that the check is being warehoused and that the payee user has received discounted fund.

As mentioned, having each transaction of a digital check stored in the blockchain as tokens allows real-time audit trail of the digital check. For example, the data stored in transaction tokens can be used to construct a transaction history of a particular digital check for viewing by a user of the customer app 810 (e.g., the GUI elements 1860, 1960, 2150, etc.).

In some embodiments, the digital check system makes available a variety of dashboards and reports based on the transaction tokens of the digital checks stored in the blockchain. In some embodiments, the transaction tokens can be used to construct reports for users of bank app 820 and clearing house app 830. For example, the clearing house app 830 can construct a report for digital checks in a particular batch of checks, or tallying the number of checks for each presenting bank, or tallying the number of checks for each issuing bank. The bank app 820 can construct a report that lists a set of digital checks. The set of digital checks can be checks that fit any criteria set forth by the bank employee, e.g., checks that are deposited at a particular date, PDCs having maturity date at a particular month, checks that the clearing house was not able to clear (insufficient fund), discounted PDCs, checks issued by a particular bank, checks having amounts greater than a threshold, etc. For each check in the list, the bank app 820 can provide one or more selectable GUI items that correspond to actions that the bank can taken on the check (e.g., to fund the check, to return check, etc.).

Figure 26A:
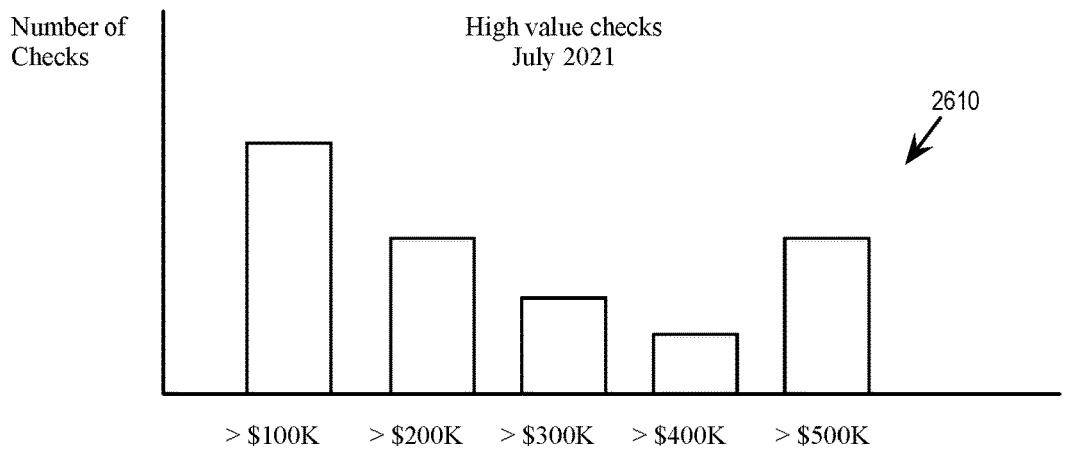
FIGS. 26A-C conceptually illustrates example reports that can generated by the digital checking system.
Figure 26A:
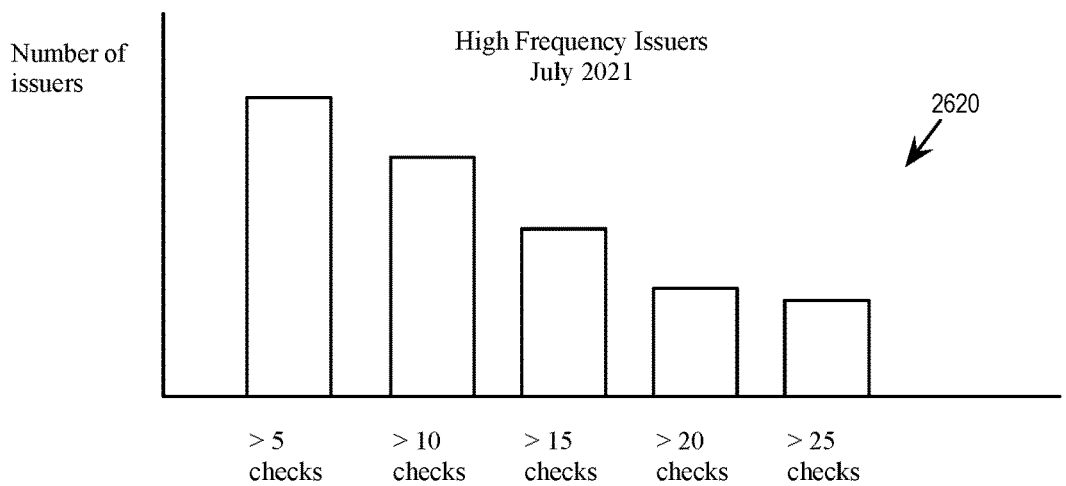
Figure 26A:
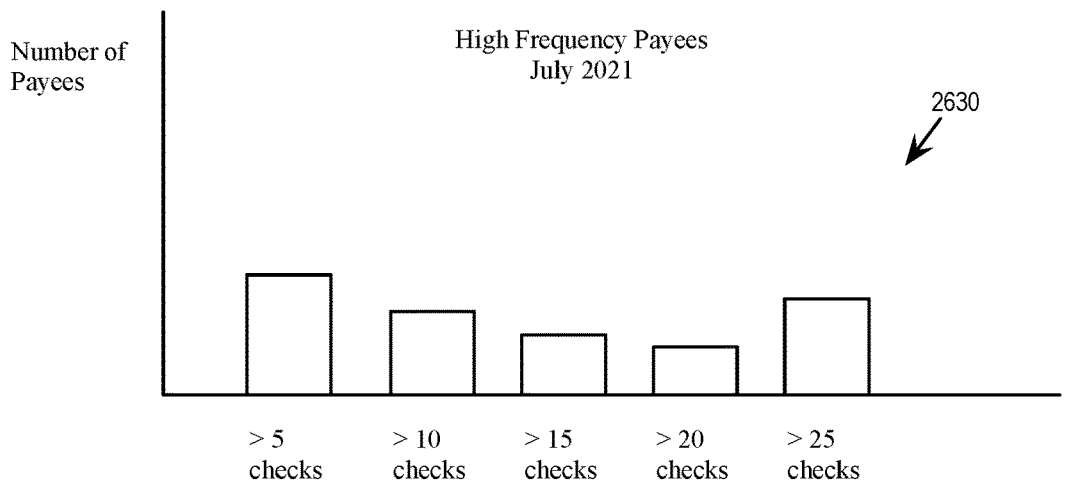
Figure 26B:
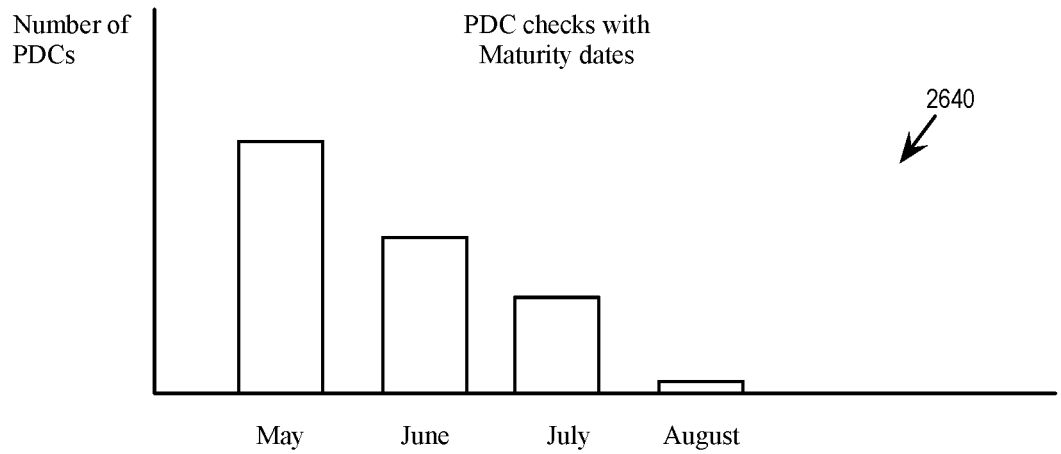
Figure 26C:
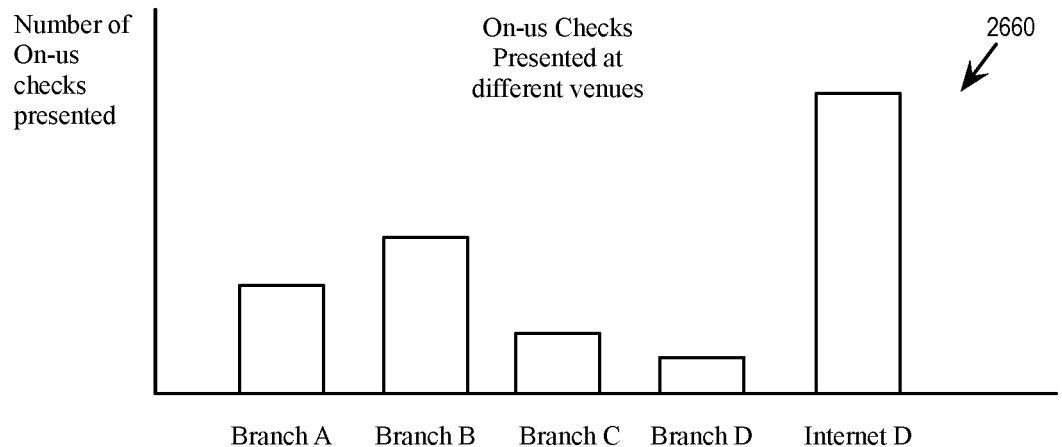

More generally, the bank app 820 can use the transaction tokens of the digital checks in the distributed ledger to monitor check transactions in real time. The bank app 820 can provide corresponding customized analytics and reports of the check transactions. FIGS. 26A-C conceptually illustrates example reports that can generated by the digital checking system.

As illustrated, the bank app 820 can generate a report 2610 on high value checks, by e.g., showing the number of checks in a particular amount range (>$100K, >$200K, >$500K, etc.) The bank app 820 can also generate a report 2620 on high frequency issuers, by e.g., showing the number of issuers having issued a specified number of checks in a given period (>5 checks, >10 checks, >15 checks, etc.). The bank app 820 can also generate a report 2630 on high frequency payees, by e.g., showing the number of customers having presented a specified number of checks (>5 checks, >10 checks, >15 checks, etc.) in a given period. The information in these reports can be obtained or derived from distributed ledger.

The bank app 820 can also use the transaction tokens of the digital checks to generate reports regarding PDCs. For example, the bank app 820 can generate a report 2640 on PDC maturity dates by e.g., showing the number of warehoused checks at the bank having maturity dates in a particular month (May of 2021, June of 2021, etc.) or on a particular date. The bank app 820 can also generate a listing 2650 of PDCs fitting specified criteria and provide detail information on each PDC in the list (date created, maturity date, payee, amount, status, etc.). The information in these reports can be obtained or derived from distributed ledger.

The bank app 20 can also use the transaction tokens of the digital checks to generate reports regarding on-us checks or encashment. For example, the bank app 820 can generate a report 2560 on the number of on-us checks presented at different branches, or through the Web/Internet, etc. The bank app 820 can also generate a listing 2570 of encashment transactions or on-us checks and provide detailed information on each on-us check. The information in these reports can be obtained or derived from distributed ledger.

Figure 27:
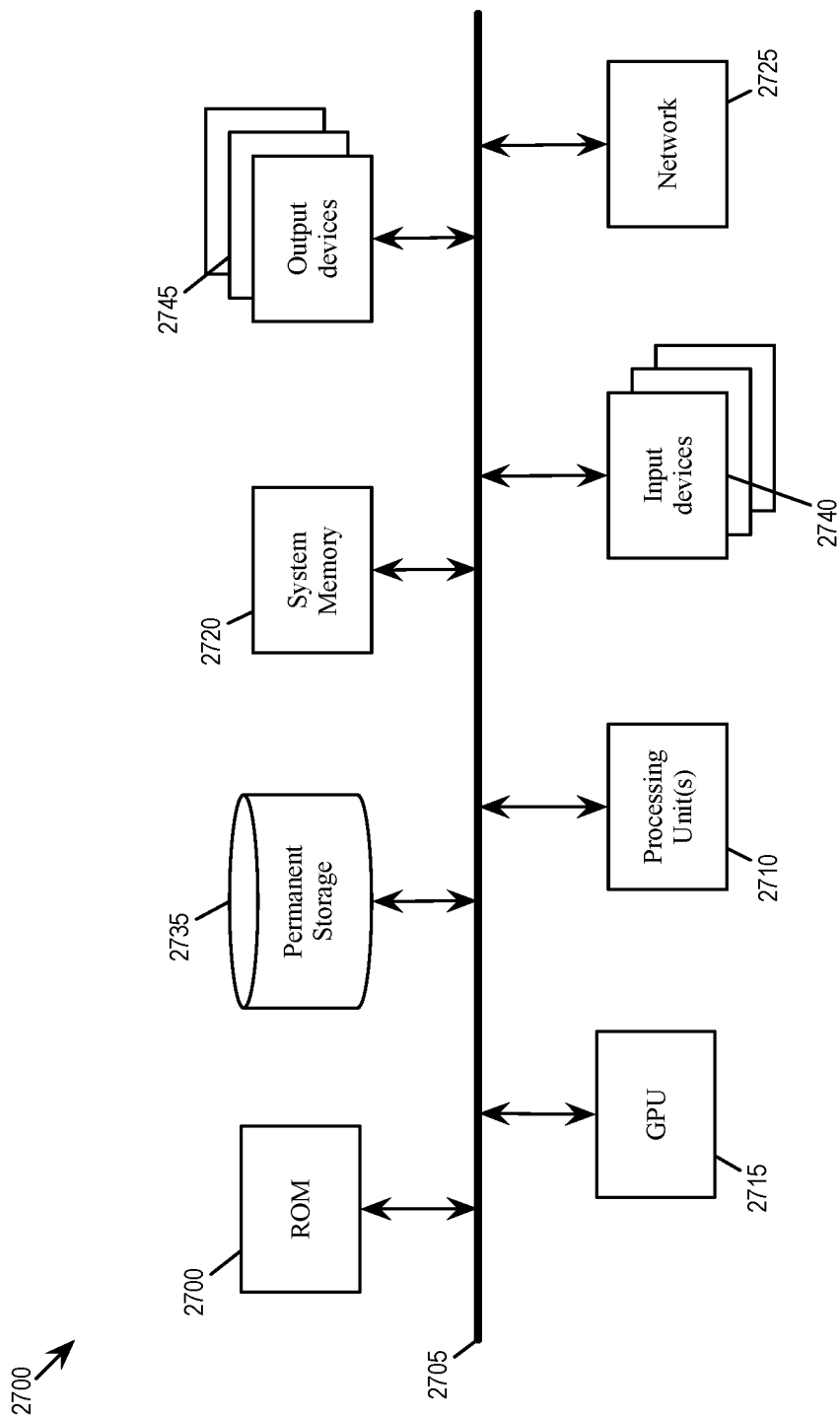
FIG. 27 conceptually illustrates a computer system with which some embodiments of the invention are implemented.

FIG. 27 conceptually illustrates a computer system 2700 with which some embodiments of the invention are implemented. The computer system 2700 can be used to implement any of the above-described hosts, controllers, and managers. As such, it can be used to execute any of the above-described processes. This computer system 2700 includes various types of non-transitory machine-readable media and interfaces for various other types of machine-readable media. Computer system 2700 includes a bus 2705, processing unit(s) 2710, a system memory 2720, a read-only memory 2730, a permanent storage device 2735, input devices 2740, and output devices 2745.

The bus 2705 collectively represents all system, peripheral, and chipset buses that communicatively connect the numerous internal devices of the computer system 2700. For instance, the bus 2705 communicatively connects the processing unit(s) 2710 with the read-only memory 2730, the system memory 2720, and the permanent storage device 2735.

From these various memory units, the processing unit(s) 2710 retrieve instructions to execute and data to process in order to execute the processes of the invention. The processing unit(s) 2710 may be a single processor or a multicore processor in different embodiments. The read-only memory (ROM) 2730 stores static data and instructions that are needed by the processing unit(s) 2710 and other modules of the computer system 2700. The permanent storage device 2735, on the other hand, is a read-and-write memory device. This device 2735 is a non-volatile memory unit that stores instructions and data even when the computer system 2700 is off. Some embodiments of the invention use a mass-storage device (such as a magnetic or optical disk and its corresponding disk drive) as the permanent storage device 2735.

Other embodiments use a removable storage device (e.g., flash drive, etc.) as the permanent storage device 2735. Like the permanent storage device 2735, the system memory 2720 is a read-and-write memory device. However, unlike storage device 2735, the system memory 2720 is a volatile read-and-write memory, such as random access memory. The system memory 2720 stores some of the instructions and data that the processor needs at runtime. In some embodiments, the invention's processes are stored in the system memory 2720, the permanent storage device 2735, and/or the read-only memory 2730. From these various memory units, the processing unit(s) 2710 retrieve instructions to execute and data to process in order to execute the processes of some embodiments.

The bus 2705 also connects to the input and output devices 2740 and 2745. The input devices 2740 enable the user to communicate information and select commands to the computer system 2700. The input devices 2740 include alphanumeric keyboards and pointing devices (also called "cursor control devices"). The output devices 2745 display images generated by the computer system 2700. The output devices 2745 include printers and display devices, such as cathode ray tubes (CRT) or liquid crystal displays (LCD). Some embodiments include devices such as a touchscreen that function as both input and output devices 2740 and 2745.

Finally, as shown in FIG. 27, bus 2705 also couples computer system 2700 to a network 2725 through a network adapter (not shown). In this manner, the computer 2700 can be a part of a network of computers (such as a local area network ("LAN"), a wide area network ("WAN"), or an Intranet, or a network of networks, such as the Internet. Any or all components of computer system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   retrieving a first non-fungible token of a digital check from a distributed ledger, the first non-fungible token comprising (i) a set of parameters of the digital check comprising a check amount, a payor, a payee, a check date, a bank identifier, and a user signature of the digital check, (ii) a first service data describing a first transaction performed on the digital check, and (iii) a first token signature that is generated based on the set of parameters of the digital check and the first service data;
   validating the first token signature; and
   in response to the first token signature being valid:
      receiving a second service data describing a second transaction performed on the digital check that is subsequent to the first transaction;
      generating a second non-fungible token of the digital check wherein the second token comprises (i) said set of parameters of the digital check, (ii) the second service data, and (iii) a second token signature that is generated based on the set of parameters of the digital check and the second service data; and
      storing the second non-fungible token of the digital check into the distributed ledger;
   retrieving the second non-fungible token of the digital check from the distributed ledger;
   validating the second token signature; and
   in response to the second token signature being valid:
      receiving a third service data describing a third transaction performed on the digital check that is subsequent to the second transaction;
      generating a third non-fungible token of the digital check wherein the third token comprises (i) said set of parameters of the digital check, (ii) the third service data, and (iii) a third token signature that is generated based on the set of parameters of the digital check and the third service data; and
      storing the third non-fungible token of the digital check into the distributed ledger.

2. The method of claim 1, wherein the distributed ledger stores a first plurality of tokens and a second plurality of tokens, each of the first plurality of tokens representing a transaction performed for a first digital check, each of the second plurality of tokens representing a transaction performed for a second, different digital check.

3. The method of claim 1, wherein the first non-fungible token is stored in a first block of the blockchain, the second non-fungible token is stored in a second block of the blockchain, and the third non-fungible token is stored in a third block of the blockchain, wherein the second block is added to the blockchain after the first block and the third block is added to the blockchain after the second block.

4. The method of claim 1, wherein the user signature of the digital check is a digital signature generated from a private key of the payor.

5. The method of claim 1, wherein the first token signature and second token signature are validated with respect to a certificate of authority.

6. The method of claim 1, wherein the first service data identifies (i) a person that performed the first transaction, (ii) a service that was performed in the first transaction, and (iii) a time of when the first service was performed; and
   the second service data identifies (i) a person that performed the second transaction, (ii) a service that was performed in the second transaction, and (iii) a time of when the second service was performed.

7. The method of claim 1, wherein the first non-fungible token is generated by a first computing device performing the first transaction, the second non-fungible token is generated by a second computing device performing the second transaction, and the third non-fungible token is generated by is generated by a third computing device performing the third transaction.

8. The method of claim 7, wherein the first service data describes the first transaction in which the payor prepares and signs the digital check and the second service data describes the second transaction in which the payee receives the digital check.

9. The method of claim 8, wherein a computing device performing the second transaction receives an authorization code that is required to access the digital check.

10. The method of claim 7, wherein the first service data describes the first transaction in which the payee of the digital check presents the digital check to a bank and the second service data describes the second transaction in which the bank receives the digital check.

11. The method of claim 10, wherein when the check date in the set of parameters of the digital check is after a current date, the second computing device warehouses the digital check at a bank and delays sending the digital check to a clearing house for settlement.

12. The method of claim 11, wherein the second computing device credits an amount to a bank account of the payee that is discounted from the amount in the set of parameters of the digital check.

13. The method of claim 7, wherein the first service data describes the first transaction in which the digital check is presented to a bank by the payee and the third service data describes the third transaction in which the digital check is settled at a clearing house.

14. The method of claim 13, wherein the third computing device identifies, based on non-fungible tokens of digital checks in the distributed ledger, a first batch of digital checks and a second batch of digital checks to be settled at different time slots, wherein a timing interval separating a first time slot for settling the first batch of digital checks and a second time slot for settling the second batch of digital checks is configurable by the third computing device.

15. The method of claim 14, wherein the third computing device determines the timing interval based on a network condition and a number of checks to be settled.

16. The method of claim 13, wherein when the check date of the digital check is after a current date, the third computing device warehouses the digital check at the clearing house and delays settling the digital check until the check date.

17. A computing device comprising:
a processor; and
a storage device storing a set of instructions, wherein an execution of the set of instructions by the processor configures the computing device to perform acts comprising:
retrieving a first non-fungible token of a digital check from a distributed ledger, the first non-fungible token comprising (i) a set of parameters of the digital check comprising a check amount, a payor, a payee, a check date, a bank identifier, and a user signature of the digital check, (ii) a first service data describing a first transaction performed on the digital check, and (iii) a first token signature that is generated based on the set of parameters of the digital check and the first service data;
validating the first token signature;
in response to the first token signature being valid:
receiving a second service data describing a second transaction performed on the digital check that is subsequent to the first transaction;
generating a second non-fungible token of the digital check wherein the second token comprises (i) said set of parameters of the digital check, (ii) the second service data, and (iii) a second token signature that is generated based on the set of parameters of the digital check and the second service data; and
storing the second non-fungible token of the digital check into the distributed ledger;
retrieving the second non-fungible token of the digital check from the distributed ledger;
validating the second token signature; and
in response to the second token signature being valid:
receiving a third service data describing a third transaction performed on the digital check that is subsequent to the second transaction;
generating a third non-fungible token of the digital check wherein the third token comprises (i) said set of parameters of the digital check, (ii) the third service data, and (iii) a third token signature that is generated based on the set of parameters of the digital check and the third service data; and
storing the third non-fungible token of the digital check into the distributed ledger.

18. A computer program product comprising:
one or more non-transitory computer-readable storage devices and program instructions stored on at least one of the one or more non-transitory storage devices, the program instructions executable by a processor, the program instructions comprising sets of instructions for:
retrieving a first non-fungible token of a digital check from a distributed ledger, the first non-fungible token comprising (i) a set of parameters of the digital check comprising a check amount, a payor, a payee, a check date, a bank identifier, and a user signature of the digital check, (ii) a first service data describing a first transaction performed on the digital check, and (iii) a first token signature that is generated based on the set of parameters of the digital check and the first service data;
validating the first token signature;
in response to the first token signature being valid:
receiving a second service data describing a second transaction performed on the digital check that is subsequent to the first transaction;
generating a second non-fungible token of the digital check wherein the second token comprises (i) said set of parameters of the digital check, (ii) the second service data, and (iii) a second token signature that is generated based on the set of parameters of the digital check and the second service data; and
storing the second non-fungible token of the digital check into the distributed ledger;
retrieving the second non-fungible token of the digital check from the distributed ledger;
validating the second token signature; and
in response to the second token signature being valid:
receiving a third service data describing a third transaction performed on the digital check that is subsequent to the second transaction;
generating a third non-fungible token of the digital check wherein the third token comprises (i) said set of parameters of the digital check, (ii) the third service data, and (iii) a third token signature that is generated based on the set of parameters of the digital check and the third service data; and
storing the third non-fungible token of the digital check into the distributed ledger.

* * * * *